US012235856B1

(12) United States Patent
Mancuso et al.

(10) Patent No.: US 12,235,856 B1
(45) Date of Patent: Feb. 25, 2025

(54) PERFORMING UNIFIED SEARCH USING A HYBRID SEARCH INDEX

(71) Applicant: Dropbox, Inc., San Francisco, CA (US)

(72) Inventors: Devin Mancuso, San Francisco, CA (US); Alan Chu, Arvada, CO (US); Brett Bergeron, Portland, OR (US); Maor Bar Asher, New York, NY (US); Ryan YeePin Yheng, Milpitas, CA (US); Shweta Kode, Sammamish, WA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/815,619

(22) Filed: Aug. 26, 2024

(51) Int. Cl.
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .................. G06F 16/24578; G06F 16/248
See application file for complete search history.

(56) References Cited

U.S. PATENT DOCUMENTS

| 8,190,541 | B2 * | 5/2012 | Downs ............... G06F 16/3326 706/20 |
| 8,688,669 | B1 * | 4/2014 | Bernstein ........... G06F 16/9535 707/705 |
| 9,037,579 | B2 | 5/2015 | Pasumarthi et al. |
| 9,043,358 | B2 | 5/2015 | Cheng et al. |
| 9,201,889 | B1 | 12/2015 | Madany et al. |
| 9,547,696 | B2 * | 1/2017 | Seth ........................ G06F 16/29 |
| 9,558,248 | B2 | 1/2017 | Kirazci et al. |
| 9,805,097 | B2 * | 10/2017 | Chang ............... G06F 16/24578 |
| 10,318,570 | B2 | 6/2019 | Billi-Duran et al. |

(Continued)

FOREIGN PATENT DOCUMENTS

| CN | 110941641 B | 6/2022 |
| CN | 111382226 B | 9/2023 |

OTHER PUBLICATIONS

"Exalead CloudViewTM Platform Highlights," Dassault Systèmes, 3DS.com/Exalead, 2012, 20 pages, Retrieved from the Internet: URL: https://www.3ds.com/fileadmin/Industries/Federal/3ds-exalead_product-sheet_cloudview-platform-highlights_us-format.pdf.

(Continued)

*Primary Examiner* — Jorge A Casanova
(74) *Attorney, Agent, or Firm* — Keller Preece PLLC

(57) ABSTRACT

The present disclosure is directed toward systems, methods, and non-transitory computer readable media for generating and searching a hybrid search index. In some embodiments, the disclosed systems generate a hybrid search index that comprises one or more content items stored at a content management system or at external network locations linked to the content management system via software connectors along with world state data associated with the one or more content items. The disclosed systems can generate a search result from the hybrid search index in response to receiving a search query of the hybrid search index. In some cases, the disclosed systems can rank one or more content items included in the search result based on observation layer data of the one or more content items.

20 Claims, 19 Drawing Sheets

(56) References Cited

U.S. PATENT DOCUMENTS

| | | | |
|---|---|---|---|
| 10,528,021 B2 | 1/2020 | Billi et al. | |
| 10,545,492 B2 | 1/2020 | Billi-Duran et al. | |
| 10,713,307 B2 | 7/2020 | Bliss et al. | |
| 10,795,895 B1* | 10/2020 | Taig | G06F 16/24578 |
| 11,531,712 B2 | 12/2022 | Gupta et al. | |
| 11,537,671 B1 | 12/2022 | Gray et al. | |
| 11,645,671 B2* | 5/2023 | Raviv | G06Q 30/0282 |
| | | | 705/14.45 |
| 11,720,920 B1* | 8/2023 | Zhou | G06F 16/245 |
| | | | 705/14.54 |
| 11,741,115 B2 | 8/2023 | Gutiérrez et al. | |
| 2012/0077521 A1 | 3/2012 | Boldyrev et al. | |
| 2014/0379661 A1 | 12/2014 | Marcus et al. | |
| 2015/0248410 A1* | 9/2015 | Stickler | G06F 16/24578 |
| | | | 707/728 |
| 2016/0132538 A1 | 5/2016 | Bliss et al. | |
| 2016/0196360 A1* | 7/2016 | Best | G06F 16/24522 |
| | | | 707/722 |
| 2016/0224682 A1 | 8/2016 | Iyer et al. | |
| 2016/0373891 A1* | 12/2016 | Ramer | H04W 4/024 |
| 2017/0075997 A1* | 3/2017 | Wan | G06F 16/9535 |
| 2017/0097933 A1* | 4/2017 | Rajan | G06F 16/9535 |
| 2017/0351226 A1 | 12/2017 | Bliss et al. | |
| 2017/0351703 A1 | 12/2017 | Shreyas et al. | |
| 2018/0075034 A1* | 3/2018 | Wang | G06F 16/24578 |
| 2020/0334305 A1* | 10/2020 | Kussmaul | G06F 16/9535 |
| 2020/0334313 A1* | 10/2020 | Kussmaul | G06F 16/951 |
| 2021/0150100 A1* | 5/2021 | Laloi | G06Q 10/0631 |
| 2021/0248643 A1* | 8/2021 | Zhang | G06Q 30/0269 |
| 2021/0406332 A1* | 12/2021 | Helvik | G06Q 10/06316 |
| 2022/0156262 A1 | 5/2022 | Chen et al. | |
| 2022/0414170 A1* | 12/2022 | Helvik | G06F 16/9535 |
| 2023/0409581 A1* | 12/2023 | Betthauser | G06N 5/022 |
| 2024/0202539 A1 | 6/2024 | Poirier et al. | |
| 2024/0256874 A1* | 8/2024 | Yousefi Maragheh | |
| | | | G06N 20/00 |
| 2024/0273145 A1* | 8/2024 | Baek | G06F 16/9035 |
| 2024/0281487 A1* | 8/2024 | Bathwal | G06F 16/9558 |

OTHER PUBLICATIONS

Non-Final Office Action from U.S. Appl. No. 18/815,606, mailed Nov. 20, 2024, 18 pages.

\* cited by examiner

PERFORMING UNIFIED SEARCH USING A HYBRID SEARCH INDEX

BACKGROUND

Advancements in search technology have given rise to a variety of methods for generating and providing search results for queries. Indeed, existing systems can quickly process repositories of data to generate and provide results specific to a user account in response to receiving a query. For example, existing systems can utilize the location, search history, and/or demographics associated with the user account to provide relevant results in response to a query. Despite these advances, however, existing search systems continue to suffer from a number of disadvantages, particularly in terms of efficiency and inflexibility.

As just suggested, some existing search systems are inefficient. In particular, users can have several user accounts across multiple unrelated third-party servers (e.g., computer applications) where they store files, images, and/or videos. Because of their separate, siloed nature, existing systems use multiple disparate search functions across the various applications to separately access, query, and search databases specific to each computer application. Not only does such a process waste computing resources by iteratively performing the same search query across multiple platforms (or by performing many searches across different platforms), but such processes also require an inordinate amount of user interaction with various graphical user interfaces and/or windows. For example, when a user searches for a specific piece of information by submitting a search query in a first computer application, the user must navigate through several—and sometimes an inordinate number of—results only to discover that the file they searched for does not or no longer exists in the database accessible by the first computer application. Thus, the user must access a second computer application and blindly perform the same task. In some cases, the user performs this cycle a number of times by navigating through several computer applications before finding their intended file (e.g., performing online searches and local database searches). Such uninformed and antiquated processes waste computing resources by repeatedly performing the same task and further result in inefficient navigation among the many interfaces and applications involved.

Moreover, many existing digital content search systems are also inflexible. In particular, many existing systems limit searching to digital content stored on local databases or on networks or servers for a single computer application. For example, the search functions of some existing systems can only access content items generated within (or otherwise associated with) a specific computer application, such as a web-based search accessing network servers or a local device search accessing a local hard drive. Moreover, in returning digital content in response to receiving a search, many existing systems display the returned results (e.g., digital content) in a random (or otherwise disorganized) manner, particularly if the search query does not match titles of digital content in the searched database. Such systems thus require users to needlessly search and sift through a list of content items to locate a target content item.

SUMMARY

Embodiments of the present disclosure provide benefits and/or solve one or more of the foregoing or other problems in the art with systems, non-transitory computer readable media, and methods for executing unified searches across various data sources by generating a hybrid search index that collects and houses searchable data. In some embodiments, the disclosed systems generate the hybrid search index using world state data, observational layer data, and/or user interaction data associated with one or more content items from different (e.g., external, internal, local, etc.) computer applications. In particular, the disclosed system can identify a first set of content items housed within a content management system and a second set of content items housed in an external third-party server (e.g., computer application). The disclosed system can identify the second set of content items by associating the content items with the content management system through software connectors. Additionally, the unified search system can determine world state data, observational layer data, and/or user interaction data for the first set of content items and second set of content items. Moreover, the unified search system can generate searchable data from the world state data, observational layer data, and/or user interaction data for the first set of content items and second set of content items. In one or more embodiments, the unified search system can generate a hybrid search index that includes the searchable data, the first set of content items and the second set of content items.

The disclosed systems also provide systems, non-transitory computer readable media, and methods for generating a search result from the hybrid search index. For example, the unified search system can receive a search query for the hybrid search index and in response to the search query can generate a search result that includes one or more content items housed in the hybrid search index that correspond to the search query. Additionally, the unified search system can rank the content items within the search result according to observation layer data, world state data, and/or user interaction data. In one or more implementations, based on the ranking of the content items, the unified search system can provide the search result with the content items in ranked order within a search result interface.

Additional features and advantages of one or more embodiments of the present disclosure are outlined in the description which follows, and in part can be determined from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

DETAILED DESCRIPTION

Figure 1:
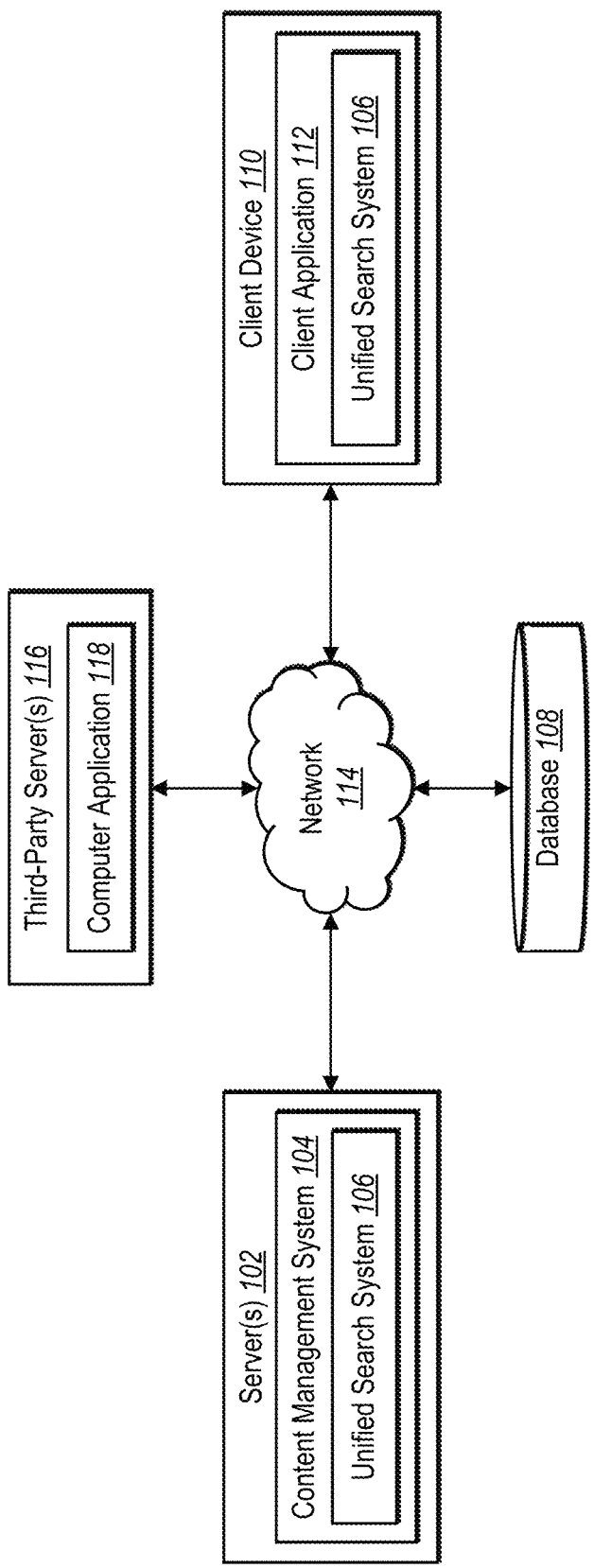
FIG. 1 illustrates a diagram of an environment in which a unified search system can operate in accordance with one or more embodiments.

This disclosure describes one or more embodiments of a unified search system that can generate a novel hybrid search index comprising one or more content items from a content management system and third-party servers and incorporating world state data, observational layer data, and/or user interaction data. Additionally, in response to receiving a search query of the hybrid search index, the unified search system can generate a search result comprising the content items ranked according to observational layer data. While this disclosure separates the discussion into overarching topics according to various functions or capabilities of the unified search system, the unified search system can also combine functions from each (or a subset) of the topical discussions. The following paragraphs provide an overview or an introduction to each of the following concepts in order: i) generating a hybrid search index and ii) generating a search result from the hybrid search index. Thereafter, additional details regarding each of the main topics are provided in relation to the figures.

Introduction to Generating a Hybrid Search Index

In some embodiments, the unified search system generates a hybrid search index that houses information, searchable data, and/or one or more content items from one or more computer applications by linking one or more computer applications via software connectors. Specifically, the unified search system can identify content items stored in a variety of local databases and network databases associated with specific web-based and/or local applications. For example, the unified search system can identify a first plurality of content items stored within a content management system and a second plurality of content items stored in an external third-party server (e.g., computer application) by linking the second plurality of content items to the content management system via one or more software connectors and/or application programming interfaces (APIs). Moreover, the unified search system can determine world state data, observational layer data, and/or user interaction data for content items to include within the hybrid search index (e.g., as metadata tags or other searchable data). Indeed, the unified search system can generate world state data and observational layer data to affiliate or tie to content items, and to further make such data searchable in a hybrid search index. The unified search system can thus generate a hybrid search index that includes the searchable data of the world state data, observational layer data, and/or user interaction data, along with the first plurality of content items and the second plurality of content items.

To identify a first plurality of content items, the unified search system can detect and/or recognize content items stored in various network locations or servers of the content management system (e.g., associated with one or more user accounts). In one or more embodiments, the unified search system can identify a second plurality of content items by associating the content management system with the second plurality of content items via software connectors. For example, the unified search system can associate the second plurality of content items with the content management system by using the software connectors to link, ingest, and/or pull the second plurality of content items stored at external network locations to the content management system to render the connector-linked content items searchable and/or otherwise manipulable or analyzable using functions of the content management system (or of the unified search system).

As mentioned, the unified search system can determine world state data, observational layer data, and/or user interaction data for content items. In particular, the unified search system can determine world state data that defines device metrics and environmental metrics corresponding to the first plurality of content items and the second plurality of content items. As example device metrics, the unified search system can determine the internal device temperature, device movement, device orientation, and/or device lighting settings as determined or measured via sensors of a client device and that result from (or are otherwise associated with) accessing, editing, and/or interacting with content items. In one or more embodiments, examples of environmental metrics can include information about physical surroundings of a client device, such as proximity of a user to the device and/or lighting conditions (e.g., indoors or outdoors) of a client device. Additional data sources included user interaction with content items and software connectors ingesting application data from external, third-party computer applications.

In some cases, the unified search system can determine observational layer data that defines the display of one or more content items. For instance, the unified search system can monitor a graphical user interface or other display data to determine the location (in pixel coordinates), depth, and duration of the display of content items and/or computer application windows depicting the content items.

Further, in some implementations, the unified search system can determine user interaction data associated with content items. For instance, the unified search system can determine user interaction data by detecting interactions with one or more content items provided for display on the client device. For example, the unified search system can detect one or more selections of selectable elements, text search queries, clicks on preview images, shares, comments, storage location changes, and/or content edits associated with the one or more content items.

As indicated above, the unified search system can generate searchable data from the world state data, observational layer data, and/or user interaction data. In particular, the unified search system can utilize a large language model to generate descriptions of the world state data, observational layer data, and/or user interaction data. For example, the unified search system can utilize the large language model to generate a world state description based on the device metrics and environmental metrics. Likewise, the unified search system can utilize the large language model to generate an observational layer description. Additionally, the unified search system can generate a user interaction description with the large language model based on one or more detected user interactions. The unified search system can further link or affiliate the model-generated descriptions with corresponding content items and can make the descriptions searchable to identify the corresponding content items.

Along these lines, the unified search system can generate a hybrid search index that holds the searchable data related to the world state data, observational layer data, and/or user interaction data, along with content items located at various storage locations (e.g., local and/or connector-linked). Indeed, in one or more embodiments, the unified search system can generate and store the hybrid search index in a database within the content management system or external to the content management system. In some cases, the unified search system can generate the hybrid search index by opening links and enabling access to the first plurality of content items in the content management system and the second plurality of content items stored at external network locations with external computer applications.

Introduction to Generating a Search Result from a Hybrid Search Index

In one or more implementations, the unified search system can generate a search result from various computer applications, local storage locations, and/or network storage locations using the hybrid search index. For example, the unified search system can receive a search query for the hybrid search index and, in response to the search query, generate a search result that includes one or more ranked content items from the hybrid search index. In some cases, the unified search system can rank the content items within the search result according to observation layer data, world state data, and/or user interaction data. In one or more implementations, the unified search system can provide the search result with the content items in ranked order within a search result interface.

In some embodiments, the unified search system can receive a search query from a client device. In particular, the unified search system can receive questions and/or instructions regarding a task or topic. For example, the unified search system can receive a multimodal search query (including text, images, videos, and/or other data) requesting a file and/or image stored in and/or linked to the hybrid search index. Additionally, the unified search system can generate a search result with one or more content items corresponding to the search query in response to the search query. For example, based on the unified search system receiving a search query for an image file, the unified search system can generate the search result with one or more content items (e.g., image files) that correspond to the search query for the image file.

Furthermore, the unified search system can rank the content items included in the search result. In particular, the unified search system can rank the content items according to observation layer data, world state data, and/or user interaction data. In some cases, the unified search system can rank the content items in the search result using observational layer data based on the historical display locations of the content items. For example, based on a recent and prolonged display of a content item, the unified search system can highly rank the content item and rank the content item as the first content item from one or more content items in the search result in response to receiving a search query relating to the content item.

In some cases, the unified search system can provide the search result for display on the client device in ranked order within the search result interface. In particular, the unified search system can provide for display the one or more ranked content items within the search result interface. For example, the unified search system can bias the content items in the search result based on the context (e.g., observational layer data, world state data, and/or user interaction data) of a user account associated with the client device. Indeed, in some embodiments, the unified search system can rank and provide content items based on user interaction data, world state data, and/or observational layer data.

As suggested above, through one or more embodiments mentioned above (and described in further detail below), the unified search system can provide several improvements or advantages over existing digital content search systems. For example, the unified search system can improve navigational efficiency and computational efficiency over existing digital content search systems. Indeed, the unified search system improves navigational efficiency by utilizing a single computer application and/or single user interface to search content items located across various external server locations, local databases, and/or external computer applications. Indeed, while some prior systems require navigating through and interacting with many different applications and interfaces to search for particular content items, the unified search system utilizes a hybrid index and search result interface that reduces the navigational inefficiency. For example, the unified search system does not have to process an excessive number of user interactions or inputs resulting from navigating between different applications and interfaces while searching for a content item because the unified search system can receive a single search query and provide a search result with content items from different computer applications in a single, unified interface.

Additionally, the unified search system improves computational efficiency by reducing the computational cost of (processing) an unnecessary number of search queries. Indeed, the unified search system reduces the number of duplicative searches across different systems and/or applications. Unlike existing systems, the unified search system efficiently processes a single search query across multiple computer applications and systems and provides relevant content items in the search result.

Moreover, the unified search system can improve flexibility over prior systems. As opposed to existing systems that are rigidly fixed to searching single-application (or single-database) data while providing results to a search query, the unified search system provides a unique all-in-one search function with access to a wide range of computer applications and databases storing content items not available to prior systems. For example, the unified search system can access and adapt searches to content items stored on external networks associated with external computer applications using software connectors. Moreover, the unified search system can adapt and rank results based on observation layer data, world state data, and/or user interaction data associated with content items. The ability to access such data allows the unified search system to provide and adapt the position or rank of content items within a search result thus enabling the unified search system to flexibly provide relevant and personalized search results in response to a search query.

On top of improved efficiency and flexibility, the unified search system can improve accuracy over prior systems. For example, by generating a search result with one or more content items from the hybrid search index based on informative context data (e.g., world state data, observation layer data, and/or user interaction data), the unified search system generates search results that are much more precise than those generated by prior systems (that do not incorporate such data). Indeed, rather than providing a random (or alphabetical or some other simple sorted) list of content items, the unified search system can generate a search result with ranked content items based on world state data, observation layer data, and/or user interaction data.

As illustrated by the foregoing discussion, the present disclosure utilizes a variety of terms to describe the features and benefits of the unified search system. Additional detail is hereafter provided regarding the meaning of these terms as used in this disclosure. For example, as used herein, the term "digital content item" (or simply "content item") refers to a digital object or a digital file that includes information interpretable by a computing device (e.g., a client device) to present information to a user. A digital content item can include a file or a folder such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents, digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A content item can also include application-specific content that is specific to a particular computer application and is accessible via a file system or via a network connection. A digital content item can be editable or otherwise modifiable and can also be sharable from one user account (or client device) to another. In some cases, a digital content item is modifiable by multiple user accounts (or client devices) simultaneously and/or at different times.

Additionally, as used herein, the term "software connector" (or more simply "connector") refers to a computer code segment, application, or program that retrieves or extracts data and/or features that define information from user-account-facing applications, such as digital calendars, video call applications, email applications, text messaging applications, digital document applications, and other applications. In some cases, a connector is as described by Vasanth Krishna Namasivayam et al. in U.S. patent application Ser. Nos. 18/478,061 and 18/478,066, titled GENERATING AND MAINTAINING COMPOSITE ACTIONS UTILIZING LARGE LANGUAGE MODELS, filed Sep. 29, 2023, both of which is incorporated herein by reference in their entireties. In one or more implementations, a connector is as described by Aniruddh Rao et al. in U.S. patent application Ser. No. 18/776,830, titled DATA INGESTION UTILIZING A COORDINATOR AND CONNECTORS, filed Jul. 18, 2024. A software connector can use web hooks, long polling, another protocol to ingest content from an external source into the environment of a content management system for interaction with content management system functions, including those of the unified search system.

As used herein, the term "world state data" refers to client device data captured by client device sensors (across a single device or across multiple devices in an area), such as an inertial measurement unit (IMU), temperature sensors, light sensors, cameras, microphones, touch sensors, and/or GPS sensors. World state data includes client device metrics indicating operating system settings and performance and physical measurements from device sensors (e.g., internal device temperature, fan speed, and screen brightness). World state data also includes environmental metrics indicating information about the physical surroundings of a client device, such as the proximity of a user to the device and/or lighting conditions (e.g., indoors or outdoors) of a client device.

As used herein, the term "observational layer data" (or "observation layer data") refers to content depicted on a client device. For instance, observational layer data can include data indicating a display of one or more content items on a client device. For example, observational layer data can indicate the position, duration, depth, and/or size of one or more content items and/or one or more portions of content items provided for display on a graphical user interface of a client device. In some cases, observational layer data can include pixel values at various pixel locations on a device display at a particular timestamp, in addition to application data for the various application windows depicting the content reflected by the pixel values.

Moreover, as used herein, the term "user interaction data" refers to information indicating interaction with the one or more content items, input fields, content management system, and/or computer applications provided for display on the graphical user interface of the client device. For example, user interaction data can indicate selections, text input, cursor movements, cursor locations, swipes, scrolling, navigation, etc. with the one or more content items, input fields, and/or computer applications within the graphical user interface of the client device. For example, user interaction data can include detecting the amount of time a user scrolls through a window within a computer application or detecting the number of times a user switches between windows of two different computer applications.

As used herein, the term "searchable data" refers to a searchable compilation of data of the world state data, observational layer data, and/or user interaction data corresponding to one or more content items. For example, in some cases, the searchable data can include descriptions about the world state data, observational layer data, and/or user interaction data for the one or more content items. To illustrate, the searchable data can include a description about the number of user interactions with a particular content item and/or one or more portions of the particular content items.

Additionally, as used herein, the term "hybrid search index" refers to a collection of data, information, and/or content items from various network locations associated with computer applications. For example, a hybrid search index can include an index of one or more content items from a content management system and/or one or more content items from computer applications external to the content management system that are linked to the content management system. For example, the hybrid search index can include data extracted from, and generated for searching among, a first plurality of content items stored at the content management system and a second plurality of content items stored at external network locations associated with external computer applications.

Moreover, as used herein, the term "search query" refers to a request for information from a database, network, and/or server and/or a request to navigate to content items or from the database, network, and/or server. For example, a search query can include data in the form of words, phrases, characters, numbers, images, video, and/or audio that initiates a search for one or more content items, one or more related content item, information within one or more content items, and/or some other data. In some embodiments, a search query can include a date, part of a file name, or a phrase within one or more content items.

Additionally, as used herein, the term "search result" refers to a list, compilation, and/or return of one or more content items in response to a search query. In particular, a search result can include one or more content items in the hybrid search index related to the search query. For example, in response to a search query requesting documents for a specified project, the unified search system can generate a search result comprising the content items related to the specified project. In some cases, the search result can include content items ranked according to observational layer data, user interaction data, and/or world state data.

Moreover, as used herein, the term "search result interface" refers to a graphical user interface that displays the one or more content items included in the search result. For example, a search result interface can include a window within a content management system that displays the ranked content items. In some cases, a search result interface can include one or more selectable elements, preview images, and/or input fields enabling further interaction with the ranked content items.

As used herein, the term "ranking" (or "rank") refers to a weighing, order, adjustment, and/or bias applied to one or more content items associated with a search query reflecting the importance, relevance, and/or significance of the one or more content items. For example, the unified search system can rank one or more content items returned in response to the search query based on observational layer data, world state data, and/or user interaction data corresponding to the one or more content items. For example, the unified search system can rank one or more content items based on the display location of the one or more content items. To further illustrate, an extended display of a content item at the center of the graphical user interface of a client device, can increase the rank of the content item within the search result interface.

Further, as used herein, the term "large language model" refers to a machine learning model trained to perform computer tasks to generate or identify content items in response to trigger events (e.g., user interactions, such as text queries, prompts, and/or button selections). In particular, a large language model can be a neural network (e.g., a deep neural network) with many parameters trained on large quantities of data (e.g., unlabeled text) using a particular learning technique (e.g., self-supervised learning). For example, a large language model can include parameters trained to generate model outputs (e.g., content items, searchable data, or query responses) and/or to identify content items based on various contextual data, including graph information from a knowledge graph, world state data, observational layer data, user interaction data, and/or historical user account behavior. In some cases, a large language model comprises a GPT model such as, but not limited to, ChatGPT.

Relatedly, as used herein, the term "machine learning model" refers to a computer algorithm or a collection of computer algorithms that automatically improve for a particular task through iterative outputs or predictions based on the use of data. For example, a machine learning model can utilize one or more learning techniques to improve accuracy and/or effectiveness. Example machine learning models include various types of neural networks, decision trees, support vector machines, linear regression models, and Bayesian networks. In some embodiments, the unified search system utilizes a large language machine-learning model in the form of a neural network.

Along these lines, the term "neural network" refers to a machine learning model that can be trained and/or tuned based on inputs to determine classifications, scores, rankings, or approximate unknown functions. For example, a neural network includes a model of interconnected artificial neurons (e.g., organized in layers) that communicate and learn to approximate complex functions and generate outputs (e.g., content items or rankings) based on a plurality of inputs provided to the neural network. In some cases, a neural network refers to an algorithm (or set of algorithms) that implements deep learning techniques to model high-level abstractions in data. A neural network can include various layers, such as an input layer, one or more hidden layers, and an output layer that each perform tasks for processing data. For example, a neural network can include a deep neural network, a convolutional neural network, a transformer neural network, a recurrent neural network (e.g., an LSTM), a graph neural network, or a generative adversarial neural network. Upon training, such a neural network may become a large language model.

Additional detail regarding the unified search system will now be provided with reference to the figures. For example, FIG. 1 illustrates a schematic diagram of an example system environment for implementing a unified search system 106 in accordance with one or more implementations. An overview of the unified search system 106 is described in relation to FIG. 1. Thereafter, a more detailed description of the components and processes of the unified search system 106 is provided in relation to the subsequent figures.

As shown, the environment includes server(s) 102, a client device 110, third-party server(s) 116, a database 108, and a network 114. Each of the components of the environment can communicate via the network 114, and the network 114 may be any suitable network over which computing devices can communicate. Example networks are discussed in more detail below in relation to FIGS. 15-16.

As mentioned above, the example environment includes a client device 110. The client device 110 can be one of a variety of computing devices, including a smartphone, a tablet, a smart television, a desktop computer, a laptop computer, a virtual reality device, an augmented reality device, or another computing device as described in relation to FIGS. 15-16. The client device 110 can communicate with the server(s) 102 via the network 114. For example, the client device 110 can receive user input from a user interacting with the client device 110 (e.g., via the client application 112) to, for instance, access, navigate, download or share a data from a computer application 118 within the third-party server(s) 116, to collaborate with a co-user of a different client device, search for one or more content items, or to select a user interface element. In addition, the unified search system 106 on the server(s) 102 can receive information relating to various interactions with user interface elements based on the input received by the client device 110 (e.g., to search for one or more content items from the computer application in the third-party server(s) 116 and the content management system 104).

As shown, the client device 110 can include a client application 112. In particular, the client application 112 may be a web application, a native application installed on the client device 110 (e.g., a mobile application, a desktop application, etc.), or a cloud-based application where all or part of the functionality is performed by the server(s) 102. Based on instructions from the client application 112, the client device 110 can present or display information, including a search result interface comprising a search result with one or more ranked content items corresponding to a search query.

As illustrated in FIG. 1, the example environment also includes the server(s) 102. The server(s) 102 may generate, track, store, process, receive, search, and transmit electronic data, such as digital content (e.g., content items), datasets, searchable data, pages of data, prompts, interface elements, world state data, observational layer data, user interaction data, interactions with interface elements, and/or interactions between user accounts or client devices. For example, the server(s) 102 may receive data from the client device 110 in the form of a search query for a content item or one or more content items related to a topic from a computer application 118 external to the content management system 104 to the content management system 104. In addition, the server(s) 102 can transmit data to the client device 110 in the form of a search result interface that includes a ranking of one or more content items corresponding to a search query of hybrid search index in the content management system 104. Indeed, the server(s) 102 can communicate with the client device 110 to send and/or receive data via the network 114. In some implementations, the server(s) 102 comprise(s) a distributed server where the server(s) 102 include(s) a number of server devices distributed across the network 114 and located in different physical locations. The server(s) 102 can comprise one or more content servers, application servers, communication servers, web-hosting servers, machine learning server, and other types of servers.

As shown in FIG. 1, the server(s) 102 can also include the unified search system 106 as part of a content management system 104. The content management system 104 can communicate with the client device 110 to perform various functions associated with the client application 112 such as searching the hybrid search index, ranking one or more content items according to observational layer data, world state data, and/or user interaction data, generating a content item summary, and/or generating a search result summary. Indeed, the content management system 104 can include a network-based smart cloud storage system to manage, store, synchronize, and maintain content items associated with user accounts within the content management system and link the content management system 104 to computer applications external to the content management system 104. In some embodiments, unified search system 106 and/or the content management system 104 utilize a database 108 to store and access the hybrid search index.

FIG. 1 further illustrates a third-party server(s) 116. In particular, the third-party server(s) 116 can host or house a computer application 118 that includes or that searches or generates (as part of its native application functions) one or more content items. For example, the third-party server(s) 116 can include a server location hosting the computer application 118 that is external to the unified search system 106 and the content management system 104. In some cases, the third-party server(s) 116 is external to the unified search system 106, but the unified search system 106 can nevertheless access the computer application 118 via one or more, connectors, plugins, APIs, or other network-based access protocols.

Although FIG. 1 depicts the unified search system 106 located on the server(s) 102, in some implementations, the unified search system 106 may be implemented by (e.g., located entirely or in part on) one or more other components of the environment. For example, the unified search system 106 may be implemented by the client device 110 and/or a third-party device. For example, the client device 110 can download all or part of the unified search system 106 for implementation independent of, or together with, the server(s) 102.

In some implementations, though not illustrated in FIG. 1, the environment may have a different arrangement of components and/or may have a different number or set of components altogether. For example, the client device 110 may communicate directly with the unified search system 106 bypassing the network 114. As another example, the environment can include the database 108 located external to the server(s) 102 (e.g., in communication via the network 114) or located on the server(s) 102, on a third-party server(s) 116, and/or on the client device 110.

Generating a Hybrid Search Index

Figure 2:
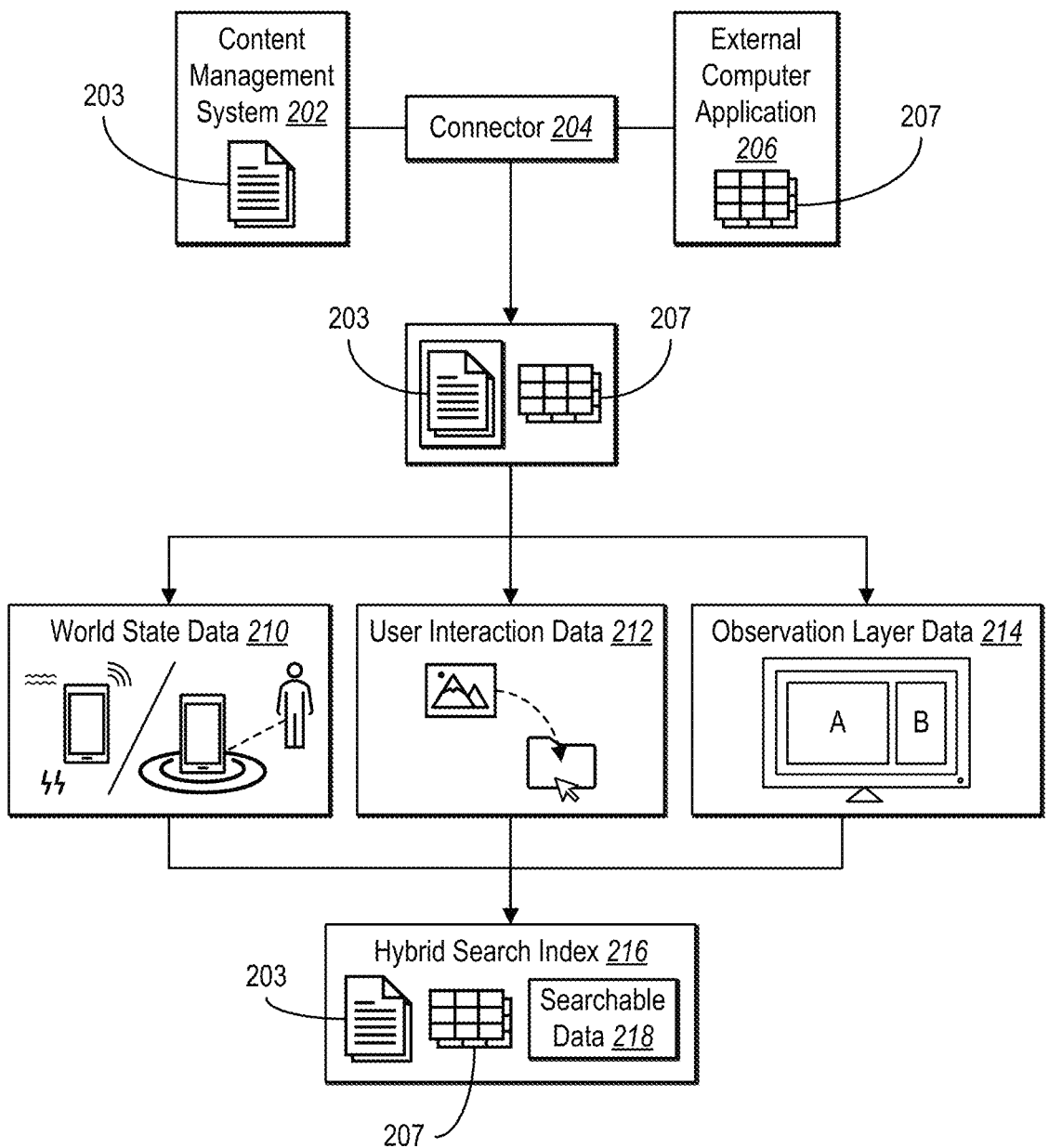
FIG. 2 illustrates an example overview of a unified search system generating a hybrid search index in accordance with one or more embodiments.

As mentioned above, the unified search system 106 can generate a hybrid search index of content items stored in various data sources (e.g., network locations specific to a content management system, network locations specific to external computer applications, or other network locations). In particular, the unified search system 106 can generate a hybrid index comprising content items stored in a content management system, content items stored in a database specifically for an external computer application, and/or searchable data generated from world state data, observational layer data, and/or user interaction data. FIG. 2 illustrates an example overview of a unified search system generating a hybrid search index in accordance with one or more embodiments. Additional detail regarding the various acts and processes introduced in FIG. 2 is provided thereafter with reference to subsequent figures.

As illustrated in FIG. 2, the unified search system 106 can identify a first plurality of content items 203 stored in one or more network locations of the content management system 202. For example, the unified search system 106 can recognize one or more content items stored in a database associated with the content management system 202. In some embodiments, the unified search system 106 can identify a second plurality of content items 207 within an external computer application 206 by linking the external computer application 206 to the content management system 202 through a connector 204. For example, the unified search system 106 can utilize the connector 204 to access, pull, and/or ingest the second plurality of content items 207 stored within the external computer application 206. In some embodiments, the unified search system 106 can utilize multiple connectors to link multiple external computer applications to the content management system 202, thereby enabling functions of the content management system 202 and/or the unified search system 106 to apply to the ingested/connected content items.

As further shown in FIG. 2, the unified search system 106 can determine world state data 210, user interaction data 212, and/or observational layer data 214. In particular, the unified search system 106 can identify world state data 210, user interaction data 212, and/or the observational layer data 214 associated with first plurality of content items 203 and/or the second plurality of content items 207. The unified search system 106 can further utilizes the world state data 210, user interaction data 212, and/or observational layer data 214 to generate a hybrid search index 216.

Along these lines, as FIG. 2 further illustrates, the unified search system 106 can generate searchable data 218 from the world state data 210, the user interaction data 212, and/or observational layer data 214. In particular, the unified search system 106 can utilize a large language model to generate descriptions of the world state data 210, the user interaction data 212, and/or observational layer data 214. For instance, the unified search system 106 can utilize the large language model to generate a user interaction description summarizing, outlining, and/or recording one or more detected user interactions with the first plurality of content items 203 and/or the second plurality of content items 207. In some embodiments, the unified search system 106 can update the searchable data based on changes to the world state data 210, user interaction data 212, and/or observational layer data 214.

From these searchable data, as shown in FIG. 2, the unified search system 106 can generate a hybrid search index 216. In one or more embodiments, the hybrid search index 216 can include the first plurality of content items 203, the second plurality of content items 207, and the searchable data 218. Indeed, as illustrated in FIG. 2, unified search system 106 can combine data extracted from, or generated for searching, one or more content items located at different databases or networks (e.g., computer applications) in the hybrid search index 216.

Figure 3:
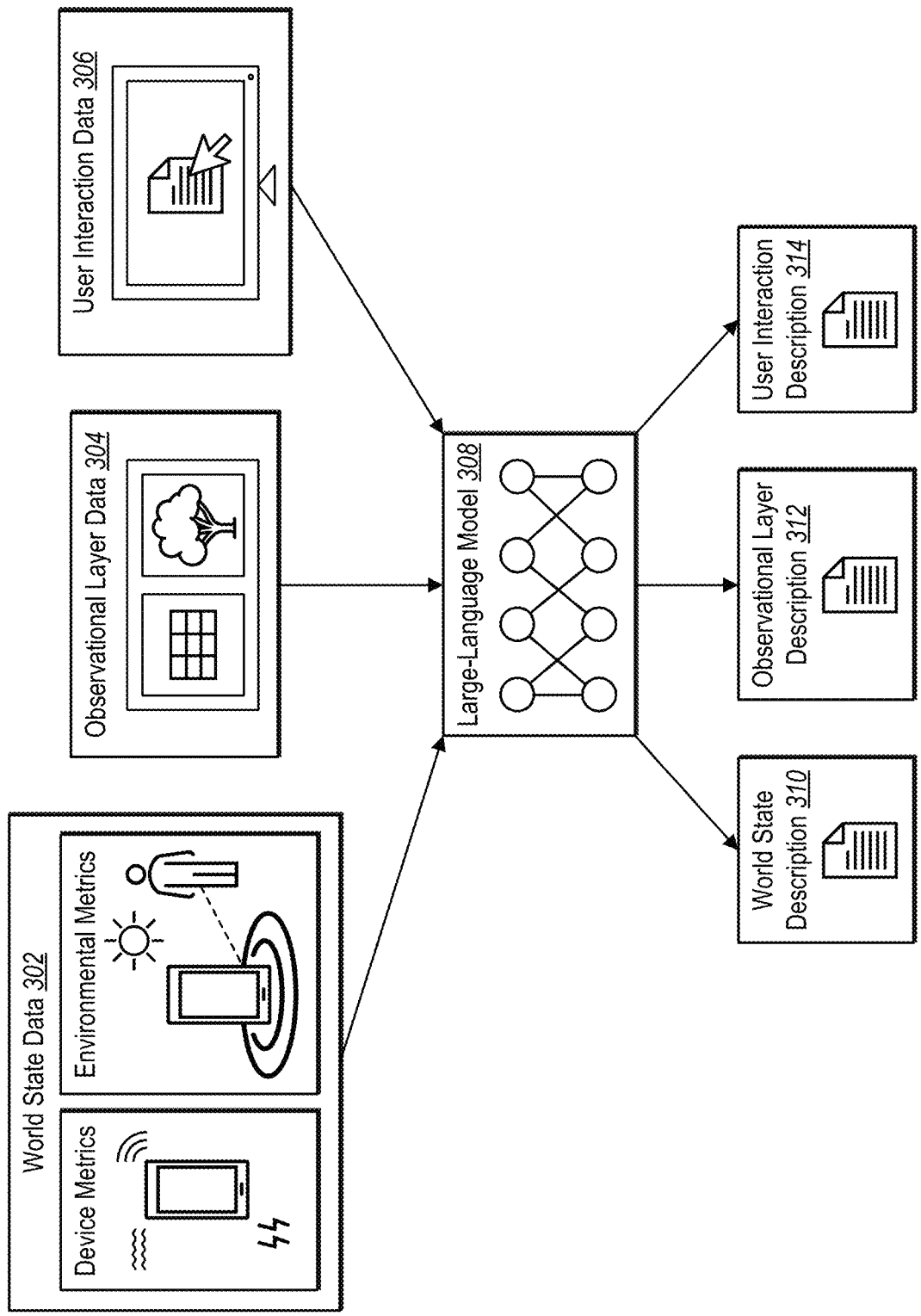
FIG. 3 illustrates a unified search system generating a world state description, observational layer description, and user interaction description in accordance with one or more embodiments.

As mentioned above, the unified search system 106 can generate and utilize descriptions of world state data, observational layer data, and/or user interaction data in the searchable data within the hybrid search index. In particular, the unified search system 106 can utilize a large language model to generate descriptions of world state data, observational layer data, and/or user interaction data to include within the hybrid search index. FIG. 3 illustrates the unified search system 106 generating a world state description, observational layer description, and user interaction description in accordance with one or more embodiments.

As shown in FIG. 3, the unified search system 106 can detect world state data 302. In particular, the unified search system 106 determines a world state of a client device, where the world state data includes or indicates the client device metrics and/or environment metrics. The unified search system 106 can determine client device metrics that indicate operation system settings, such as brightness settings, language settings, fan speed settings, contrast settings, and dark mode settings. The unified search system 106 can also utilize operation system functions and/or internal device sensors to monitor or detect processor performance and/or memory performance of the client device. In addition, the unified search system 106 can determine client device metrics indicating physical measurements from sensors of the client device. Specifically, the unified search system 106 utilizes an internal temperature sensor to determine an internal temperature of the client device (e.g., of a processor within the client device).

To further illustrate, the unified search system 106 can monitor how the client device accessing, displaying, and/or interacting with the content items affects the device metrics of the world state data 302. In some cases, the unified search system 106 can log the effects of interactions with the content items to the world state data 302 and include those changes as searchable world state data. For example, the unified search system 106 can detect, monitor, and log the fan speed and brightness settings while displaying a video content item on the client device. Moreover, the unified search system 106 can detect an edit to the video content item and determine a change in fan speed based on detecting the edit. In one or more implementations, the unified search system 106 can log the world state data 302 corresponding to one or more operations performed on the content items and provide logged the world state data 302 to the large language model 308 to generate searchable world state data.

In addition, the unified search system 106 determines environmental metrics of a client device. Indeed, the unified search system 106 can determine a world state of the client device based on physical measurements or readings from the client device and/or from nearby client devices (e.g., devices within a threshold distance of the client device). For example, the unified search system 106 utilizes a camera to determine a brightness of the environment or the physical surroundings of the client device. Additionally, the unified search system 106 utilizes the camera to determine a proximity of a user to the client device and/or an engagement with the client device (e.g., eye movement and focus). Further, the unified search system 106 utilizes an external temperature sensor of the client device to determine an external temperate of the environment of the client device. Further still, the unified search system 106 utilizes a microphone to detect ambient noise in the environment of the client device. In some embodiments, the unified search system 106 utilizes a GPS sensor to determine a coordinate location (e.g., latitude, longitude, and/or elevation) of the client device. In some cases, the unified search system 106 utilizes the aforementioned sensors of the client device and of client devices within a threshold distance of the client device to build a world state based on average sensor reading values.

In one or more embodiments, the unified search system 106 can detect how accessing and/or performing one or more operations on one or more content items affects the environmental metrics of the world state data 302 of the client device. For example, the unified search system 106 can determine the GPS location of the client device while accessing and reading a document content item. In some cases, the unified search system 106 can determine the external temperature of the client device while the unified search system 106 detects a user interaction of highlighting a sentence in the document content item. As described above, the unified search system 106 can detect and log the effects on the environmental metrics of performing particular operations on the content items. In some cases, the unified search system 106 can provide the log of the effects of operations on the content items to the large language model 308 to generate searchable world state data.

As further shown in FIG. 3, the unified search system 106 can determine observational layer data 304 for the first plurality of content items and the second plurality of content items. For example, the unified search system 106 can utilize an observation layer program that includes a computer script that monitors digital content displayed on a client device. Indeed, the unified search system 106 can utilize the observation layer program to track displayed content items, including item identifiers for the displayed items, network locations where the items are stored, and computer applications presenting the various content items.

To generate searchable data for a hybrid search index from the observational layer data 304, the unified search system 106 can identify one or more displayed content items from the first plurality of content items and the second plurality of content items and track (and include as searchable data for content items) the position, display time, display duration, depth, movement, size, and/or layer of displayed content items. For example, the unified search system 106 can identify open computer applications and recognize one or more open content items (e.g., identifiers for files and/or file types) within the open computer application. In some implementations, the unified search system 106 can detect an open web browser application and identify one or more open tabs (e.g., second plurality of content items), including tab placement or depth among open tabs, within the open web browser application. In one or more embodiments, the unified search system 106 can also access the web browser application and/or the one or more open tabs within the open web browser application through the software connectors.

Additionally, in some cases, the unified search system 106 can monitor the display of content items by taking screenshots or determining pixel locations of content depicted in a graphical user interface of the client device. For example, the unified search system 106 can automatically (without user interaction to prompt but according to permission settings of a user account) capture one or more screenshots and/or recordings of the graphical user interface of the client device. The unified search system 106 can also determine additional observational layer data from the one or more screenshots and/or recordings (or based on display of content without taking screenshots). For example, as indicated above, the unified search system 106 can determine the position and/or layer of a z-index of a window and/or an open tab within an open web browser application. In some embodiments, the unified search system 106 can determine the observational layer data 304 by receiving one or more uploaded screenshots and/or recordings from a user account.

In some cases, the unified search system 106 determines and tracks pixel values at various pixel coordinate locations of a display screen for a client device, including metadata indicating content item identifiers, computer applications, and network locations associated with the various pixels and their values. Additionally, the unified search system 106 tracks changes in displayed content (e.g., in pixel values) over time, determining timestamps associated with displayed content items (and/or pixel values).

As further shown in FIG. 3, the unified search system 106 can determine user interaction data 306. In particular, the unified search system 106 can monitor or detect user interactions (or user account behavior) with the first plurality of content items within the content management system 104 and/or user interactions with the second plurality of content items stored at external network locations. For example, the unified search system 106 can detect and/or monitor accesses, clicks, hovers, navigations, scrolls, zoom-ins, zoom-outs, shares, comments, edits, receipts, moves, deletes, new content creations, clips (e.g., generating content items from other content items), and/or other user interactions over time to determine frequencies, recencies, and/or overall numbers of user interactions of the user account with the first plurality content items and/or the second plurality of content items. For example, the unified search system 106 can detect a selection of a text file stored on an external network associated with an online document editor. Indeed, the unified search system 106 can detect and collect one or more user interactions with the first plurality of content items and the second plurality of content items within different computer applications. The unified search system 106 can further store or include the interaction types, the interactions and their effects, the timing of the interactions, and/or the locations of the interactions within the content items (or within a graphical user interface or an overall display of a client device) as searchable data within a hybrid search index.

As further shown in FIG. 3, the unified search system 106 can generate (as searchable data for a hybrid search index) descriptions based on the world state data 302, observational layer data 304, and/or user interaction data 306. In particular, the unified search system 106 can utilize a large language model 308 to generate a world state description 310, an observational layer description 312, and/or a user interaction description 314. For example, the unified search system 106 can input the world state data 302 into the large language model 308 and cause the large language model 308 to generate a summary, list, and/or outline of the world state data corresponding to the first plurality of content items and/or the second plurality of content items. To illustrate, the unified search system 106 can provide to the large language model 308 the data regarding the internal temperature of the client device, ambient noise surrounding the client device, and/or position of the user relative to the client device while accessing a video (e.g., content item) stored on a streaming platform external to the content management system. In some cases, the large language model 308 can generate an outline detailing the internal temperature of the client device, ambient noise surrounding the client device, and/or position of the user relative to the client device, as observed while the unified search system 106 displays the video (or based on other device interactions with specific content items).

Likewise, as shown in FIG. 3, the unified search system 106 can generate an observational layer description 312. In some cases, the unified search system 106 can provide observational layer data 304 corresponding to the first plurality of content items and/or the second plurality of content items to the large language model 308. Subsequently, in one or more embodiments, the large language model 308 can generate a summary, list, and/or outline of the observational layer data 304 for the first plurality of content items and/or the second plurality of content items. To illustrate, the unified search system 106 can determine the position and layering of a text document (e.g., content item) from the first plurality of content items on top of an image (e.g., content item) from the second plurality of content items. The unified search system 106 can input the positional and layer data into the large language model 308, which can generate a summary or textual representation of the observational layer data 304 for the text document and image.

Additionally, the unified search system 106 can generate a user interaction description 314. In particular, the unified search system 106 can determine the user interaction data 306 for the first plurality of content items and/or the second plurality of content items and provide the user interaction data 306 to the large language model 308. In some cases, the large language model 308 can generate a summary, list, and/or outline of the user interaction data 306 and how that corresponds to the first plurality of content items and the second plurality of content items. For example, the unified search system 106 can detect scrolling within a data table (e.g., content item) of the first plurality of content items and a magnification (e.g., zoom-in) of an image (e.g., content item) of the second plurality of content items. As mentioned above, the unified search system 106 can provide the scrolling and magnification data to the large language model 308, and the large language model 308 can generate a summary compiling and describing the scrolling and magnification information in relation to the data table and image.

In one or more embodiments, the unified search system 106 can store the world state description 310, observational layer description 312, and the user interaction description 314 in a hybrid search index along with the first plurality of content items and the second plurality of content items. In some cases, the unified search system 106 can generate a combined description comprising the world state description 310, the observational layer description 312, and/or the user interaction description 314. In some cases, the unified search system 106 can utilize a neural network to generate the world state description 310, the observational layer description 312, and/or the user interaction description 314.

Figure 4:
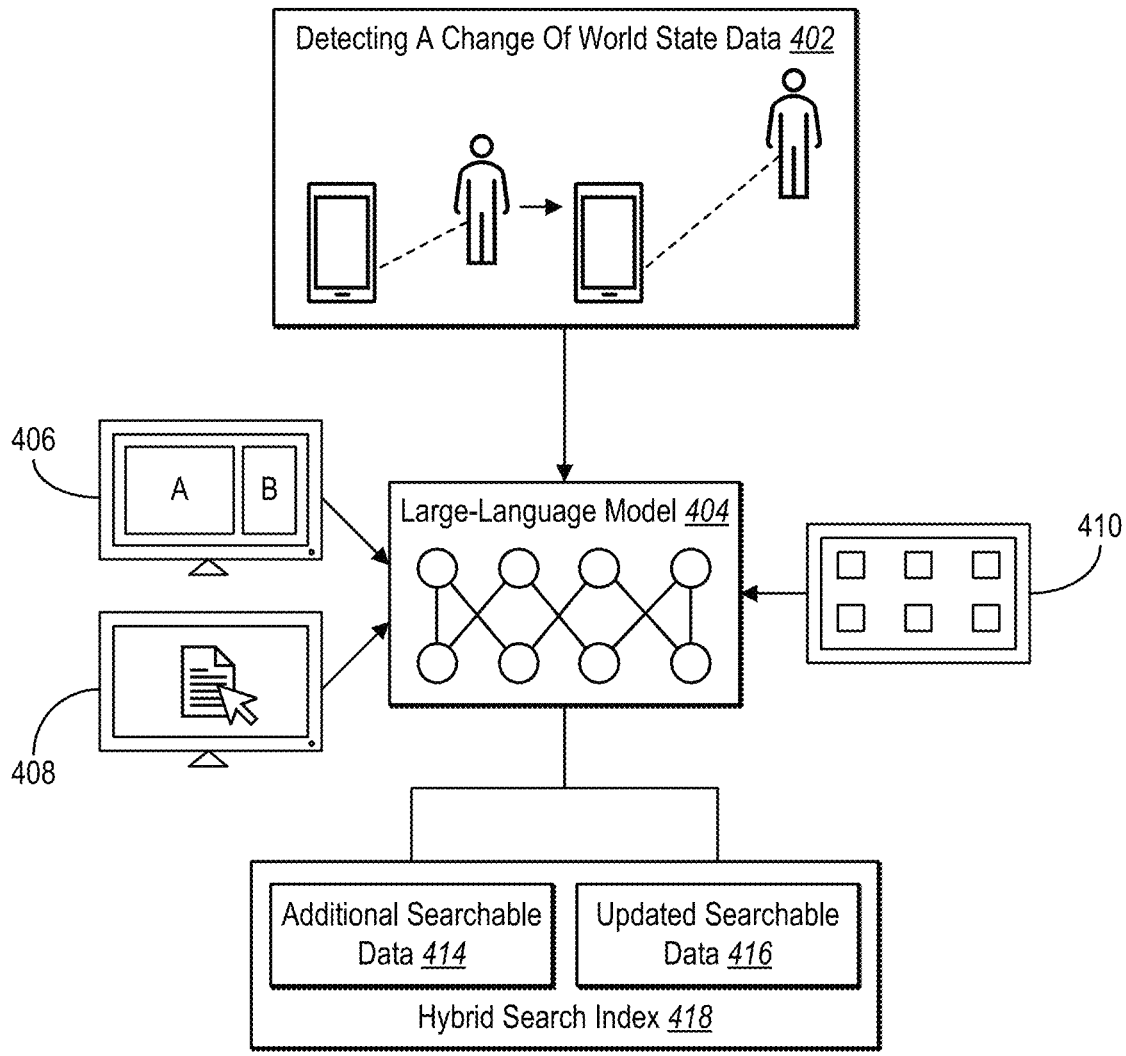
FIG. 4 illustrates a unified search system generating additional searchable data and updating searchable data in accordance with one or more embodiments.

As just discussed, the unified search system 106 can monitor world state data, observational layer data, and/or user interaction data and can generate descriptions based on the changes. The unified search system 106 can thus update the hybrid search index based on the changes. FIG. 4 illustrates a unified search system updating the hybrid search index by generating additional searchable data and updating searchable data in accordance with one or more embodiments.

As shown in FIG. 4, the unified search system 106 can perform the act 402 of detecting a change of the world state data. In particular, the unified search system 106 can detect one or more changes to the device metrics and/or environmental metrics of a client device. For example, the unified search system 106 can detect one or more changes to the internal temperature, brightness settings, language settings, fan speed settings, contrast settings, dark mode settings, device location, environmental lighting conditions, ambient noise, and/or camera data indicating a change of position of a user relative to the client device. In one or more embodiments, the unified search system 106 can update the searchable data based on the detected changes of the world state data. For example, the unified search system 106 can provide the one or more detected changes of the world state data to a large language model 404, and the large language model 404 can generate updated searchable data 416 by updating the world state description (or generating a new world state description) based on the one or more changes to the world state data. In one or more embodiments, the unified search system 106 can further detect one or more changes to observational layer data 406 and/or user interaction data 408.

As just indicated, in some cases, the unified search system 106 can update the searchable data based on the one or more changes to the observational layer data 406 and the user interaction data 408. For example, the unified search system 106 can detect one or more changes to the user interaction data 408 by receiving one or more additional user interactions with the first plurality of content items and/or the second plurality of content items. For example, in some cases, after the unified search system 106 generates the searchable data, the unified search system 106 can detect one or more additional clicks, hovers, scrolls, zoom-ins, zoom-outs, shares, comments, edits, and/or other user interactions. In some cases, the unified search system 106 can update a user interaction description (or generate a new user interaction description) by providing the one or more additional user interactions to the large language model 404. For example, the large language model 404 can edit the user interaction description by adding the one or more additional user interactions, removing one or more user interactions, and/or editing the one or more existing user interactions in the user interaction description based on the one or more additional user interactions.

Additionally, the disclosed method can update the searchable data in the hybrid search index 418 based on changes to the observational layer data 406. For example, the unified search system 106 can detect one or more changes to the observational layer data 406 by detecting and/or receiving changes to the display of the first plurality of content items and/or the second plurality of content items. For example, the unified search system 106 can detect one or more changes to position, display time, display duration, depth, movement, size, and/or layer of one or more displayed content items from the first plurality of content items and/or the second plurality of content items after generating searchable data from the observational layer data 406. Indeed, the unified search system 106 can update the observational layer description (or generate a new observational layer description) based on the one or more detected changes to the display of the first plurality of content items and/or the second plurality of content items. For example, the unified search system 106 can detect a change in the size of a window of an external computer application displaying a content item from the second plurality of content items. In some cases, based on the detected change in the size of the window, the unified search system 106 can cause the large language model 404 to update the observational layer description.

In one or more embodiments, the unified search system 106 can generate the updated searchable data 416 by determining an interest of a user account associated with the client device, the first plurality of content items, and/or the second plurality of content items. In particular, the unified search system 106 can determine the interest of the user account based on the user interaction data 408 (and/or world state data and/or observational layer data). For example, the unified search system 106 can determine the interest based on detecting and determining the amount of time spent and number of clicks on one or more content items from the first plurality of content items and/or the second plurality of content items. In some cases, the unified search system 106 can input the user interaction data 408 into the large language model 404 and/or neural network to determine the interest of the user account. For example, based on several clicks on documents and images related to "Project Cleo," the unified search system 106 can determine that the interest of the user account relates to "Project Cleo." In some cases, once the unified search system 106 determines the interest of the user account, the unified search system 106 can update the searchable data by including the interest of the user account in the searchable data.

Likewise, the unified search system 106 can update the searchable data in the hybrid search index 418 by determining the interest based on the observational layer data 406. For example, based on the position and size of windows or tabs of the content items from the first plurality of content items and/or second plurality of content items, the unified search system 106 can determine the interest of the user account. In one or more implementations, the unified search system 106 can determine the interest by inputting the observational layer data 406 into the large language model 404 or neural network. In some cases, the unified search system 106 can update the searchable data by including the interest of the user account based on the observational layer data in the searchable data.

In some cases, the unified search system 106 can determine the interest of the user account based on at least one of the act 402, the observational layer data 406, or the user interaction data 408. For example, in one or more embodiments, the unified search system 106 can detect the user interaction data 408 and the observational layer data 406 for a chat-based computer application. In particular, the unified search system 106 can monitor the messages passed between one or more user accounts on the chat-based computer application and identify an interest (e.g., key goals, projects, entities, etc.) based on the user interaction data 408 and the observational layer data 406 while generating the messages. Indeed, the unified search system 106 can include the interest of the user account in the hybrid search index 418.

As further shown in FIG. 4, the unified search system 106 can generate and store additional searchable data 414 in the hybrid search index 418. For example, the unified search system 106 can generate the additional searchable data 414 by determining user interaction data 408 for the first plurality of content items and/or the second plurality of content items and providing the user interaction data 408 to the large language model 404 to generate a summary, compilation, list, etc. of the user interaction data 408. As shown in FIG. 4, the unified search system 106 can include the additional searchable data 414 in the hybrid search index 418 along with the searchable data from the world state data.

In some cases, the unified search system 106 can further generate additional searchable data from observational layer data 406 for the first plurality of content items and the second plurality of content items. For instance, the unified search system 106 can determine the observational layer data 406 and generate an observational layer description. In some cases, the unified search system 106 can generate additional searchable data 414 for the hybrid search index 418 by including the observational layer description to the searchable data from the world state data.

In one or more embodiments, where the hybrid search index 418 includes searchable data from the user interaction data 408 or observational layer data 406, the unified search system 106 can generate additional searchable data from world state data for the first plurality of content items and/or second plurality of content items by generating and/or adding the world state description to the searchable data from the user interaction data 408 or the observational layer data 406.

As shown in FIG. 4, the unified search system 106 can identify a third plurality of content items 410 stored locally at the client device. For instance, the third plurality of content items 410 can include digital objects or digital files stored on the hard drive or memory of the client device. In some cases, the unified search system 106 can determine the world state data, observational layer data 406, and/or user interaction data for the third plurality of content items 410. In some cases, the unified search system 106 can update the searchable data by including the world state data, observational layer data 406, and/or user interaction data 408 of the third plurality of content items 410.

For example, in one or more cases, the unified search system 106 can generate, utilizing the large language model 404, a world state description based on the world state data defining the device metrics and the environmental metrics for the first plurality of content items, the second plurality of content items, and the third plurality of content items 410. The unified search system 106 can include the world description for the first plurality of content items, the second plurality of content items, and the third plurality of content items 410 in the hybrid search index 418. In one or more embodiments, the unified search system 106 can generate an observational layer description based on the observational layer data corresponding to the third plurality of content items 410. Likewise, the unified search system 106 can generate a user interaction description based on the user interaction data corresponding to the third plurality of content items 410.

In one or more embodiments, the additional searchable data 414 can include a log of one or more historical changes to the first plurality of content items, the second plurality of content items, and/or the third plurality of content items 410 and/or one or more changes made to the act 402, the observational layer data 406, and/or the user interaction data 408. For example, the unified search system 106 can maintain a history or log of the one or more changes to the first plurality of content items, the second plurality of content items, and/or the third plurality of content items 410 and/or one or more changes made to the act 402, the observational layer data 406, and/or the user interaction data 408. In some cases, the unified search system 106 can, via the large language model 404, make the one or more changes to the content items searchable data and include them within the hybrid search index 418. For example, the unified search system 106 can log edits to a content item made during the first week of a month and the third week of the month and include the edits in the hybrid search index 418.

Figure 5:
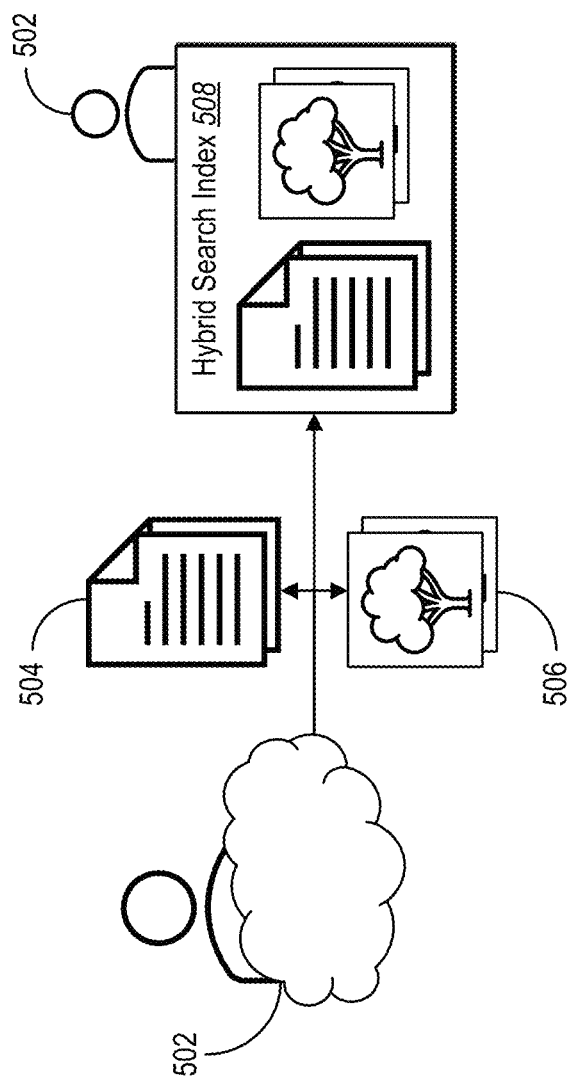
FIG. 5 illustrates a unified search system generating a hybrid search index specific to a user account in accordance with one or more embodiments.

As just discussed, the unified search system 106 can update the hybrid search index by generating additional search data and/or updating the searchable data within the hybrid search index. In one or more implementations, the unified search system 106 can personalize the hybrid search index. FIG. 5 illustrates a unified search system 106 generating a hybrid search index specific to a user account in accordance with one or more embodiments.

As shown in FIG. 5, the unified search system 106 can identify a user account 502 within the content management system 104. Moreover, the unified search system 106 can further associate the user account 502 with the first plurality of content items 504 and/or the second plurality of content items 506. For example, in one or more embodiments, the unified search system 106 can associate the first plurality of content items 504 and/or the second plurality of content items 506 with the user account 502 based on determining if the user account 502 generates, edits, and/or accesses the first plurality of content items 504 and/or the second plurality of content items 506. For example, based on the user account 502 generating one or more video files on an external computer application, the unified search system 106 can associate the one or more video files with the user account 502.

In one or more cases, the unified search system 106 can generate a hybrid search index 508 specific to the user account 502 by storing the first plurality of content items 504 and the second plurality of content items 506 associated with the user account 502 in the hybrid search index 508. Moreover, in one or more embodiments, the unified search system 106 can further store searchable data from the world state data, observational layer data, and/or user data corresponding to the first plurality of content items 504 and/or second plurality of content items 506 associated with the user account 502.

In some embodiments, the unified search system 106 can associate a group and/or organization with the first plurality of content items 504 and/or the second plurality of content items 506 and generate a hybrid search index 508 specific to the group and/or organization.

Figure 6A:
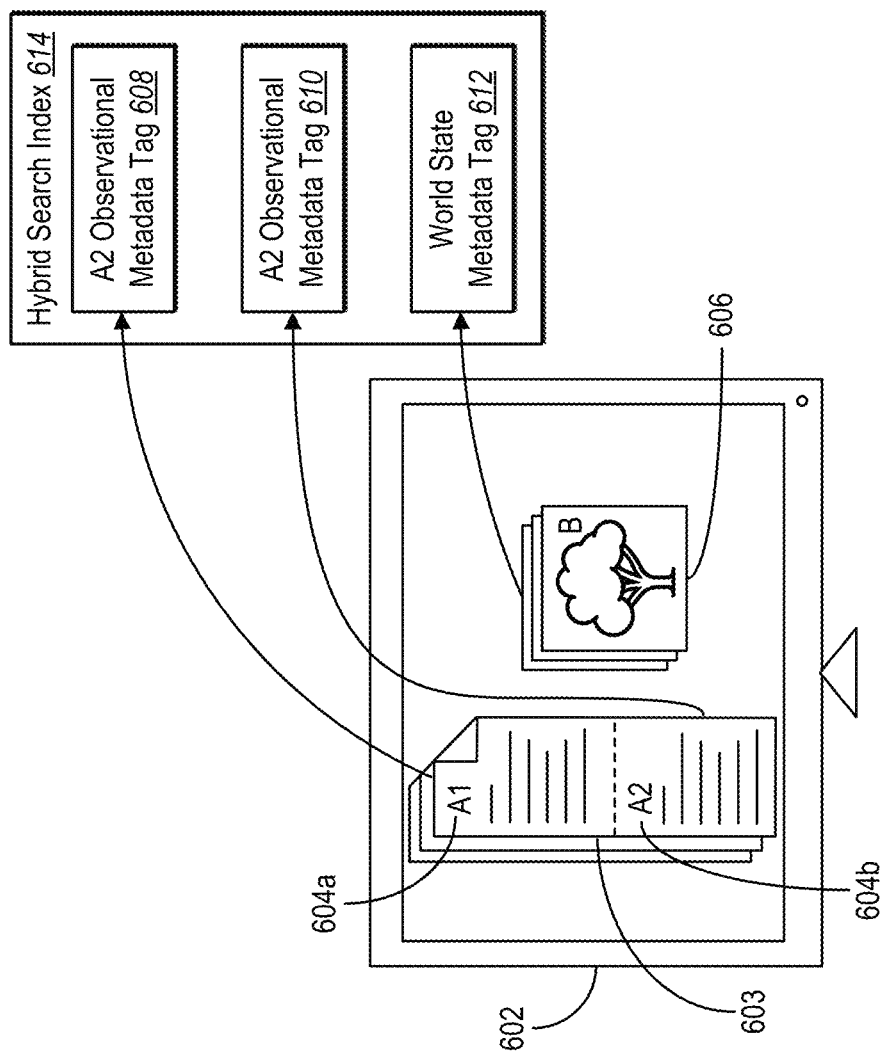
FIGS. 6A-6B illustrate a unified search system generating one or more metadata tags and extracting data associated with the one or more metadata tags in accordance with one or more embodiments.
Figure 6B:
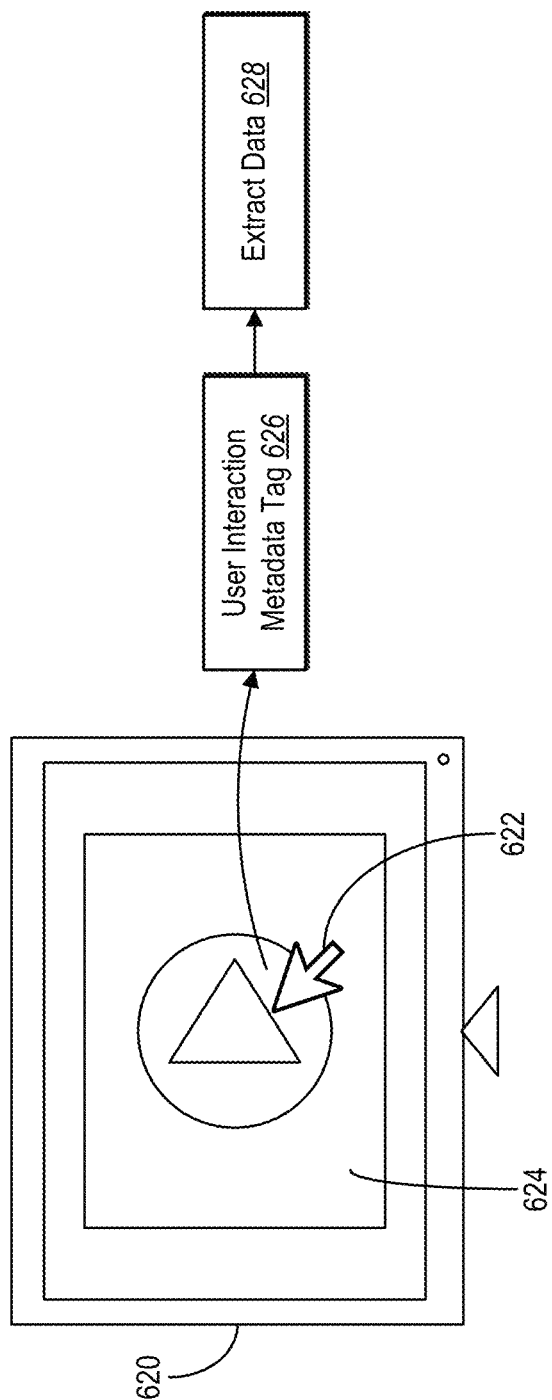

In one or more implementations, the unified search system 106 can generate and utilize metadata tags to determine observational layer data and/or user interaction data about the first plurality of content items and/or the second plurality of content items. FIGS. 6A-6B illustrate the unified search system 106 generating one or more metadata tags and extracting data associated with one or more metadata tags in accordance with one or more embodiments. In particular, FIG. 6A illustrates the unified search system 106 generating observational metadata tags and storing the observational metadata tags in the hybrid search index in accordance with one or more embodiments.

As shown in FIG. 6A, the unified search system 106 can provide for display on a client device 602 a content item 603 corresponding to a first plurality of content items and a content item 606 corresponding to a second plurality of content items. As described above in reference to FIG. 3, the unified search system 106 can determine observational layer data corresponding to the first plurality of content items and/or the second plurality of content items. In one or more embodiments, the unified search system 106 can generate or extract observational metadata tags 608, 610 from the content item 603 from the first plurality of content items and/or generate or extract a world state metadata tag 612 for the content item 606 from the second plurality of content items. In some implementations, the observational metadata tag 608, 610 can refer to a piece of data associated with a content item 603 that describes the display, context, structure, and/or additional attributes of the content item 603 displayed on the client device 602. For instance, the observational metadata tag 608, 610, can refer to a data packet that includes details about a content item's title, author, creation date, position, display time, display duration, depth, movement, size, computer application, keywords/key phrases associated with the content item 603 (or the first portion 604a or the second portion 604b of the content item 603) displayed on the client device 602.

As shown in FIG. 6A, the unified search system 106 can generate an observational metadata tag 608 that corresponds to a first portion 604a of the content item 603 and an observational metadata tag 610 that corresponds to a second portion 604b of the content item 603 from a first plurality of content items. In some instances, the observational metadata tags 608, 610 can include information about the display of the first portion 604a and the second portion 604b of the content item 603, along with other information about the first portion 604a and the second portion 604b of the content item 603. For example, the observational metadata tag 608 and the observational metadata tag 610 can indicate the display of the first portion 604a and the second portion 604b of the content item 603, when the display of the first portion 604a and the second portion 604b occurred, the length of the display time of the first portion 604a and the second portion 604b, and/or the tabs and/or windows of the display of the first portion 604a and the second portion 604b of the content item 603.

In one or more cases, the unified search system 106 can generate additional observational metadata tags and/or update the observational metadata tag 608, 610 based on detecting one or more changes to the observational layer data associated with the content item 603, 606 and/or portion 604a, 604b of the content item 603. As further shown in FIG. 6A, in one or more cases, the unified search system 106 can add and/or include the observational metadata tags 608, 610 to the hybrid search index 614.

Additionally, the unified search system 106 can generate a world state metadata tag 612 for the content item 606 corresponding to the second plurality of content items. In one or more embodiments, the world state metadata tag 612 can refer to a piece of data associated with a content item that describes the device metrics, environmental metrics, context, structure, and/or additional attributes of the content item 606 displayed on the client device 602. For example, the world state metadata tag 612 can be a datagram or data packet that includes details about a content item's title, author, creation date, brightness settings, language settings, fan speed settings, contrast settings, and dark mode settings, device location, environmental lighting conditions, ambient noise, or camera data indicating a position of a user relative to the client device associated with the one or more content items computer application, keywords/key phrases associated with the content item 606 displayed on the client device 602. To further illustrate the world state metadata tag 612 can indicate the location, memory performance, and brightness settings of the client device 602 while displaying the content item 606, along with the association of an external computer application to the content item 606.

As just mentioned, the unified search system 106 can generate observational layer metadata tags for content items from the first plurality of content items and/or the second plurality of content items. In some cases, the unified search system 106 can generate user interaction metadata tags for the content items from the first plurality of content items and/or the second plurality of content items. FIG. 6B illustrates the unified search system 106 generating a user interaction metadata tag and utilizing the metadata tag to extract content from the first plurality of content items and/or the second plurality of content items in accordance with one or more embodiments.

For example, as shown in FIG. 6B, the unified search system 106 can detect a user interaction 622 by receiving a selection of a play button on a content item 624 (e.g., video file) associated with a first plurality of content items displayed on a client device 620. As FIG. 6B illustrates, the unified search system 106 can generate a user interaction metadata tag 626. In one or more implementations, the user interaction metadata tag 626 can refer to a piece of data associated with a content item that describes the user interaction, context, structure, and/or additional attributes of the content item 624 displayed on the client device 620. For instance, the user interaction metadata tag 626 can refer to a data packet that includes details about a content item's title, author, creation date, accesses, clicks, hovers, navigations, scrolls, zoom ins, zoom outs, shares, comments, edits, receipts, moves, deletes, new content creations, clips, computer application, keywords/key phrases associated with the content item 624 (or portion of the content item 624) displayed on the client device 620. For example, the user interaction metadata tag 626 can indicate the timing, frequency, and/or duration of the user interaction 622 with the content item 624. To further illustrate, the user interaction metadata tag 626 can indicate that the user interaction 622 of selecting a play element occurred at 4:30 PM on Thursday, Jul. 24, 2024. In some embodiments, the user interaction metadata tag 626 can include previous (or historic) user interactions with the content item 624. For example, the user interaction metadata tag 626 can include previous user interactions with the content item 624, indicating that the unified search system 106 detected movement (or dragging) of the window of the content item 624 and editing of the content item 624 on Wednesday, Jul. 23, 2024. Indeed, in some embodiments, the unified search system 106 can generate user interaction metadata tags for one or more portions of the content item 624. Additionally, as described above, in some cases, the unified search system 106 can include the user interaction metadata tag 626 in the hybrid search index.

As further shown in FIG. 6B, the unified search system 106 can extract data 628 from the first plurality of content items and/or the second plurality of content items. For example, based on the data stored in the user interaction metadata tag 626, the unified search system 106 can extract data 628 associated with the content item from the first plurality of content items and/or the second plurality of content items. To illustrate, the unified search system 106 can extract the content of the content item 606 and/or the computer application associated with the content item. Additionally, the unified search system 106 can extract data 628 from content items based on an observational metadata tag in one or more embodiments. For example, the unified search system 106 can extract which computer applications are open and windowed in the graphical user interface of the client device 620.

As just mentioned, in one or more embodiments, the unified search system 106 can generate and encode data in the user interaction metadata tag 626, the observational metadata tag 608, 610, and/or the world state metadata tag 612. In one or more embodiments, the unified search system 106 can recognize one or more patterns associated with the first plurality of content items, the second plurality of content items, and/or third plurality of content items. In particular, the unified search system 106 can recognize through the observational layer data, user interaction data, and/or world state data one or more habits, tendencies, and/or orders of accessing, interacting, and/or editing one or more data types from the first plurality of content items, the second plurality of content items, and/or the third plurality of content items. Indeed, the unified search system 106 can recognize one or more patterns and/or pathways regarding text documents, images, audio files, video files. For example, the unified search system 106 can recognize a repeated pathway indicating how a user account first accesses a text document then sends a meeting invite related to the document based on the observational layer data and user interaction data of the text document and meeting invite. In some cases, the unified search system 106 can encode or index the patterns related to data types, a user account(s), the first plurality of content items, the second plurality of content items, and/or the third plurality of content items and store the patterns in the hybrid search index.

FIGS. 1-6B, the corresponding text, and the examples provide a number of different systems and methods for generating a hybrid search index. In addition to the foregoing, implementations can also be described in terms of flowcharts comprising acts/steps in a method for accomplishing a particular result. For example, FIG. 7 illustrates an example flowchart of a series of acts for generating a hybrid search index in accordance with one or more embodiments.

Figure 7:
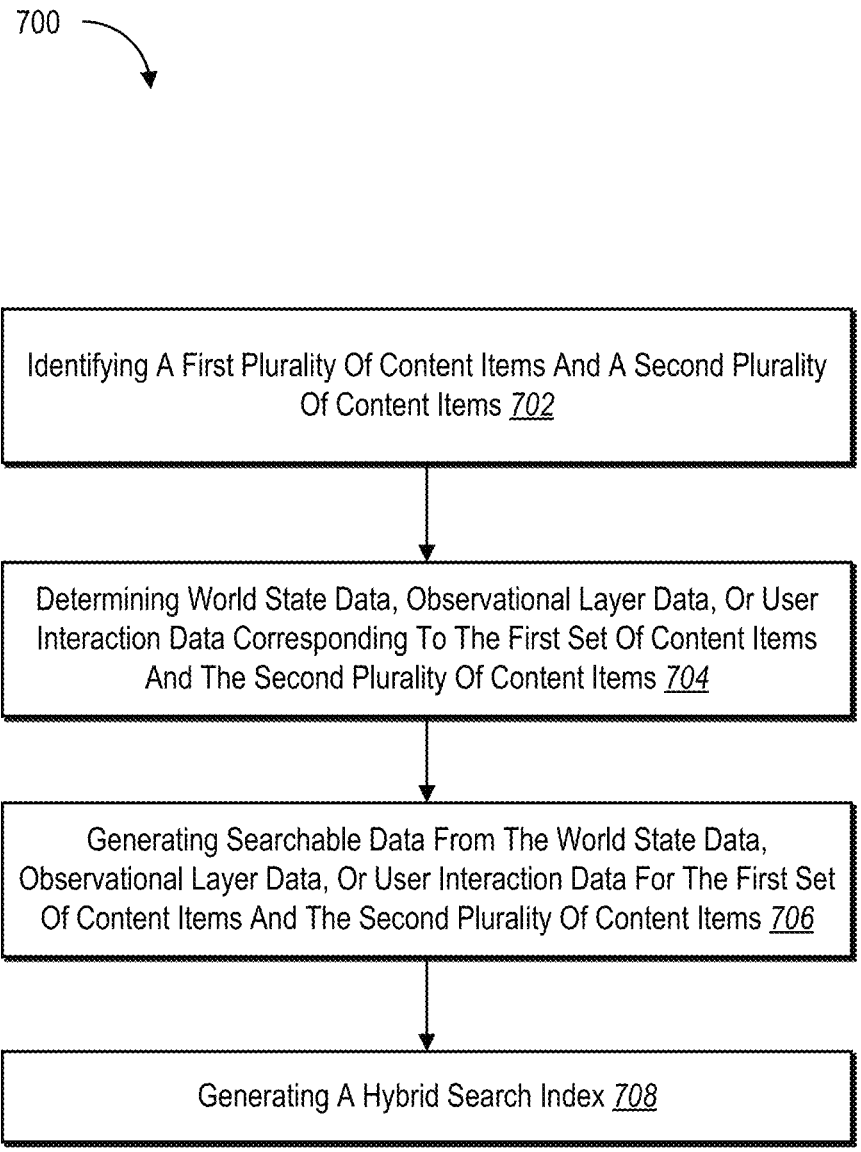
FIG. 7 illustrates an example flowchart of a series of acts for generating a hybrid search index in accordance with one or more embodiments.

As illustrated in FIG. 7, the series of acts 700 may include an act 702 of identifying a first plurality of content items and a second plurality of content items. For example, in one or more embodiments, the act 702 can include identifying a first plurality of content items stored at a content management system and a second plurality of content items stored at external network locations associated with external computer applications, wherein the second plurality of content items is associated with the content management system via software connectors. In addition, the series of acts 700 includes an act 704 of determining world state data, observational layer data, or user interaction data corresponding to the first plurality of content items and the second plurality of content items. For example, in one or more embodiments, the act 704 can include determining, for the first plurality of content items and the second plurality of content items, world state data defining device metrics and environmental metrics corresponding to the first plurality of content items and the second plurality of content items. In addition, the series of acts 700 includes an act 706 of generating searchable data from the world state data, observational layer data, or user interaction data for the first plurality of content items and the second plurality of content items. For instance, in some implementations, the act 706 can include generating searchable data from the world state data for the first plurality of content items and the second plurality of content items. As further illustrated in FIG. 7, the series of acts 700 includes an act 708 of generating a hybrid search index. For example, act 708 can include generating a hybrid search index comprising the searchable data, the first plurality of content items, and the second plurality of content items.

Further, in one or more embodiments, the series of acts 700 includes an act of generating the searchable data further by: generating, utilizing a large language model, a world state description based on the device metrics and the environmental metrics corresponding to the first plurality of content items and the second plurality of content items.

Additionally, the series of acts 700 can include an act where the device metrics comprise at least one of internal device temperature, device movement, device orientation, or device lighting settings of a client device. Moreover, in one or more embodiments, the series of acts 700 can include an act where the environmental metrics comprise at least one of device location, environmental lighting conditions, ambient noise, or camera data indicating a position of a user relative to the client device.

Further, in one or more embodiments, the series of acts 700 includes identifying a user account associated with a client device and the first plurality of content items and the second plurality of content items. In addition, the series of acts 700 can include generating the hybrid search index specific to the user account associated with the client device and the first plurality of content items and the second plurality of content items.

Additionally, in some cases, the series of acts 700 includes detecting one or more changes to the world state data based on the one or more changes to the device metrics or the environmental metrics. Further, in one or more implementations, the series of acts 700 can include updating the searchable data by utilizing a large language model to update a world state description based on the one or more changes to the world state data.

Moreover, in one or more embodiments, the series of acts 700 includes generating additional searchable data from observation layer data for the first plurality of content items and the second plurality of content items. In some cases, the series of acts 700 includes including the additional searchable data from the observation layer data in the hybrid search index.

In some cases, the series of acts 700 can include identifying a third plurality of content items stored locally at a client device. Additionally, in one or more embodiments, the series of acts 700 includes updating the searchable data by including the world state data defining the device metrics and the environmental metrics corresponding to the third plurality of content items.

Moreover, in one or more embodiments, the series of acts 700 can include identifying a first plurality of content items stored at a content management system and a second plurality of content items stored at external network locations associated with external computer applications, wherein the second plurality of content items is associated with the content management system via software connectors. Additionally, in some cases the series of acts 700 can include determining, for the first plurality of content items and the second plurality of content items, observational layer data defining display of one or more content items corresponding to the first plurality of content items and the second plurality of content items provided for display within a graphical user interface of a client device. In some implementations, the series of acts 700 includes generating searchable data from the observational layer data for the first plurality of content items and the second plurality of content items. In one or more cases, the series of acts 700 can include generating a hybrid search index comprising the searchable data, the first plurality of content items, and the second plurality of content items.

Furthermore, the series of acts 700 can generate the searchable data by generating, utilizing a large language model, an observational layer description based on the display within the graphical user interface of the client device, of the one or more content items corresponding to the first plurality of content items and the second plurality of content items.

Additionally, the series of acts 700 includes generating one or more observational metadata tags identifying one or more portions of the one or more content items corresponding to the first plurality of content items and the second plurality of content items provided for display in the graphical user interface of the client device. Moreover, the series of acts 700 can include including the one or more observational metadata tags in the hybrid search index.

Further, the series of acts 700 can include determining the observational layer data by monitoring the graphical user interface of the client device. Moreover, the series of acts 700 includes identifying one or more portions of the one or more content items corresponding to the first plurality of content items and the second plurality of content items provided for display in the graphical user interface of the client device.

Moreover, in some cases, the series of acts 700 includes determining an interest of an entity based on the observational layer data. Additionally, the series of acts 700 includes updating the searchable data to include the interest of the entity based on the observational layer data.

Additionally, in one or more implementations, the series of acts 700 can include generating one or more observational metadata tags corresponding to one or more content items based on detecting display of the one or more content items corresponding to the first plurality of content items and the second plurality of content items provided for display within a graphical user interface of a client device. Further, the series of acts 700 can include adding the one or more observational metadata tags to the hybrid search index.

Furthermore, the series of acts 700 can include determining user interaction data for the first plurality of content items and the second plurality of content items. In some embodiments, the series of acts 700 can include generating additional searchable data from the user interaction data for the first plurality of content items and the second plurality of content items. Additionally, in one or more implementations, the series of acts 700 can include including the additional searchable data from the user interaction data in the hybrid search index.

Moreover, in some cases, the series of acts 700 can include identifying a first plurality of content items stored at a content management system and a second plurality of content items stored at external network locations associated with external computer applications, wherein the second plurality of content items is associated with the content management system via software connectors. Additionally, in one or more embodiments, the series of acts 700 includes determining, for the first plurality of content items and the second plurality of content items, user interaction data defining detected interactions with one or more content items corresponding to the first plurality of content items and the second plurality of content items provided for display within a graphical user interface of a client device. Further, the series of acts 700 can include generating searchable data from the user interaction data for the first plurality of content items and the second plurality of content items. In some cases, the series of acts 700 includes generating a hybrid search index comprising the searchable data, the first plurality of content items, and the second plurality of content items.

Furthermore, in one or more embodiments, the series of acts 700 includes receiving, via the client device, one or more user interactions with at least one of one or more selectable elements, one or more text input fields, or one or more cursor locations corresponding to the first plurality of content items and the second plurality of content items provided for display within the graphical user interface of the client device. Additionally, in some cases, the series of acts 700 can include generating one or more user interaction metadata tags corresponding to the first plurality of content items and the second plurality of content items based on the one or more user interactions. Moreover, in some implementations, the series of acts 700 includes extracting content from the first plurality of content items and the second plurality of content items based on the one or more user interaction metadata tags.

Further, in some cases, the series of acts 700 includes generating the searchable data from the user interaction data by generating, via a large language model, a user interaction description of one or more detected interactions with the first plurality of content items and the second plurality of content items.

In one or more embodiments, the series of acts 700 can include determine an interest of a user account associated with the client device and the first plurality of content items and the second plurality of content items based on the user interaction data. Additionally, in some cases, the series of acts 700 includes updating the searchable data from the user interaction data for the user account by including the interest of user account in the searchable data.

Moreover, in one or more implementations, the series of acts 700 includes detecting one or more changes to the user interaction data based on receiving one or more additional user interactions with the first plurality of content items and the second plurality of content items. Furthermore, in some cases, the series of acts 700 can include updating the searchable data comprising the user interaction data based on the one or more additional user interactions.

Additionally, in some embodiments, the series of acts 700 can include determine world state data for the first plurality of content items and the second plurality of content items. Further, in one or more implementations, the series of acts 700 includes generating additional searchable data from the world state data for the first plurality of content items and the second plurality of content items. In addition, in some cases, the series of acts 700 includes including the additional searchable data from the user interaction data in the hybrid search index.

Generating Search Results from the Hybrid Search Index

Figure 8:
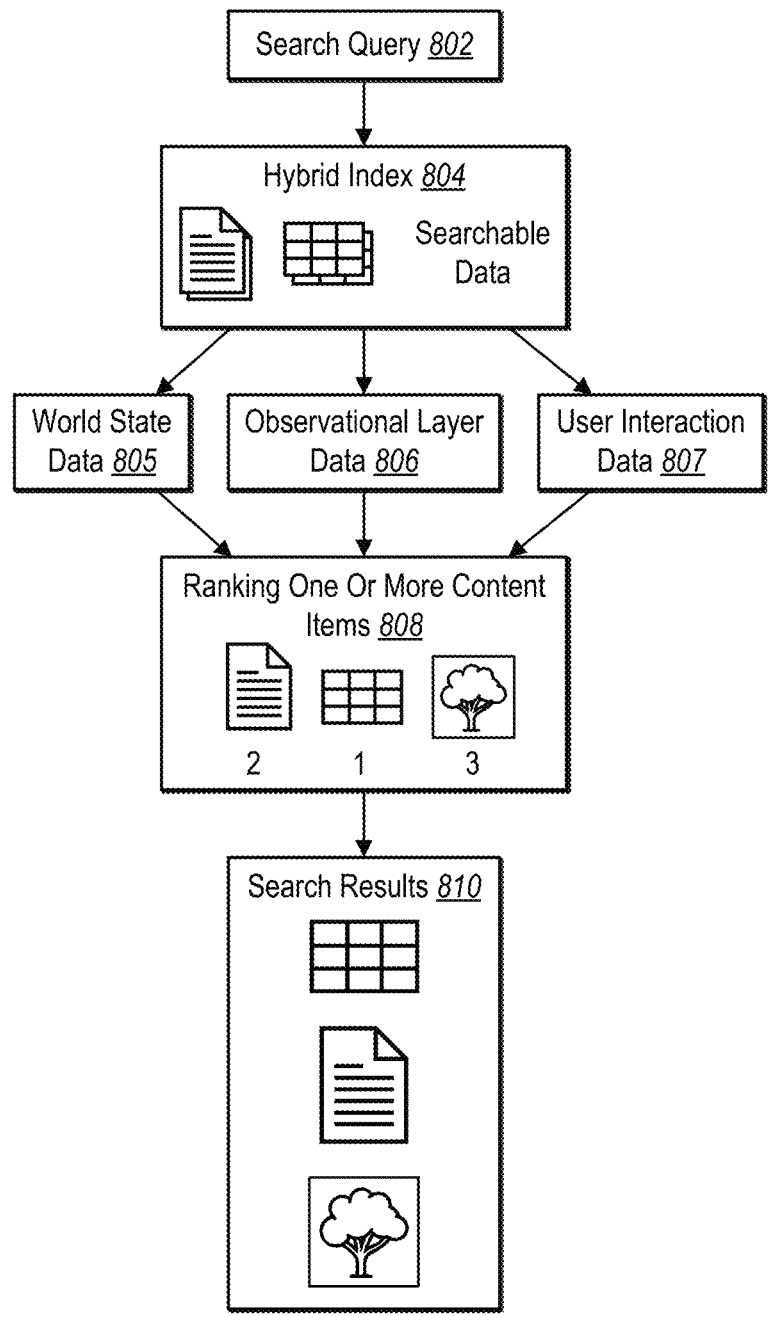
FIG. 8 illustrates an example overview of a unified search system generating search results comprising one or more ranked content items in accordance with one or more embodiments.

As mentioned above, in certain embodiments, the unified search system 106 generates a hybrid search index. Indeed, the unified search system 106 can generate a hybrid search index comprising searchable data related to world state data, observational layer data, and/or user interaction data along with a first plurality of content items and a second plurality of content items described above in relation to FIGS. 1-7. In one or more embodiments, the unified search system 106 can utilize the hybrid search index to generate a search result that includes one or more content items from across various computer applications in response to a single search query. FIG. 8 illustrates an example overview generating search results comprising one or more ranked content items in accordance with one or more embodiments. Additional detail regarding the various acts of FIG. 8 is provided thereafter with reference to subsequent figures.

As illustrated in FIG. 8, the unified search system 106 can receive a search query 802 from a client device for searching a hybrid search index 804. For example, the unified search system 106 can receive a search query 802 including terms, images, and/or other multimodal input for searching databases across various platforms and databases. Indeed, the search query 802 can include information included within the hybrid search index 804. In some cases, the unified search system 106 can receive the search query through an input field provided within unified search interface of a content management system 104. For example, the unified search system 106 can receive, via the input field, a text search query looking for documents (e.g., content items) generated on a specific date or discussing a certain topic. In one or more embodiments, the unified search system 106 can receive at least one of text, imagery, or video as a search query to the hybrid search index 804. For example, the unified search system 106 can receive a video clip along with the text "find other clips" as the search query and return a search result with one or more video clips corresponding to the search query.

As further shown in FIG. 8, the unified search system 106 can generate a search result 810 in response to receiving the search query 802 of the hybrid search index 804. As shown in FIG. 8, the search result 810 can include one or more content items that correspond to the search query 802. In one or more embodiments, the unified search system 106 determines which content items correspond to the search query 802 by comparing the search query 802 with the one or more content items. For example, the unified search system 106 can utilize semantic, vector, keyword, and/or lexical search methods to associate the one or more content items within the hybrid search index 804 with the search query 802.

As FIG. 8 further illustrates, the unified search system 106 can perform the act 808 of ranking the one or more content items according to world state data 805, observational layer data 806, and/or user interaction data 807. In particular, the unified search system 106 can utilize the world state data 805, observational layer data 806, and/or user interaction data 807 to weigh content items within the search result 810 to provide and highlight the most relevant content items in the search result. For example, based on the historical display, historical location of a client device, and/or historical edits of a content item associated with the search query 802, the unified search system 106 can increase the rank of the content item or change the order of one or more content items included in the search result. In some cases, the unified search system 106 can further rank and/or update the rank of the one or more content items based on world state data and/or user interaction data.

As FIG. 8 further shows, the unified search system 106 can provide the search result for display on the client device with the content items in ranked order within a search result interface. For instance, based on the act 808 of ranking the one or more content items, the unified search system 106 can display the one or more content items in ranked order within the search result interface. In some cases, the search result interface can include selectable elements, input fields, and/or preview images for the search result and/or content items within the search result. For example, the unified search system 106 can provide a selectable content item summarization element within the search result interface. In some cases, in response to receiving a selection of the selectable content item summarization element, the unified search system 106 can generate, via a large language model, a content item summary summarizing the content item and/or one or more portions of the content item.

Figure 9:
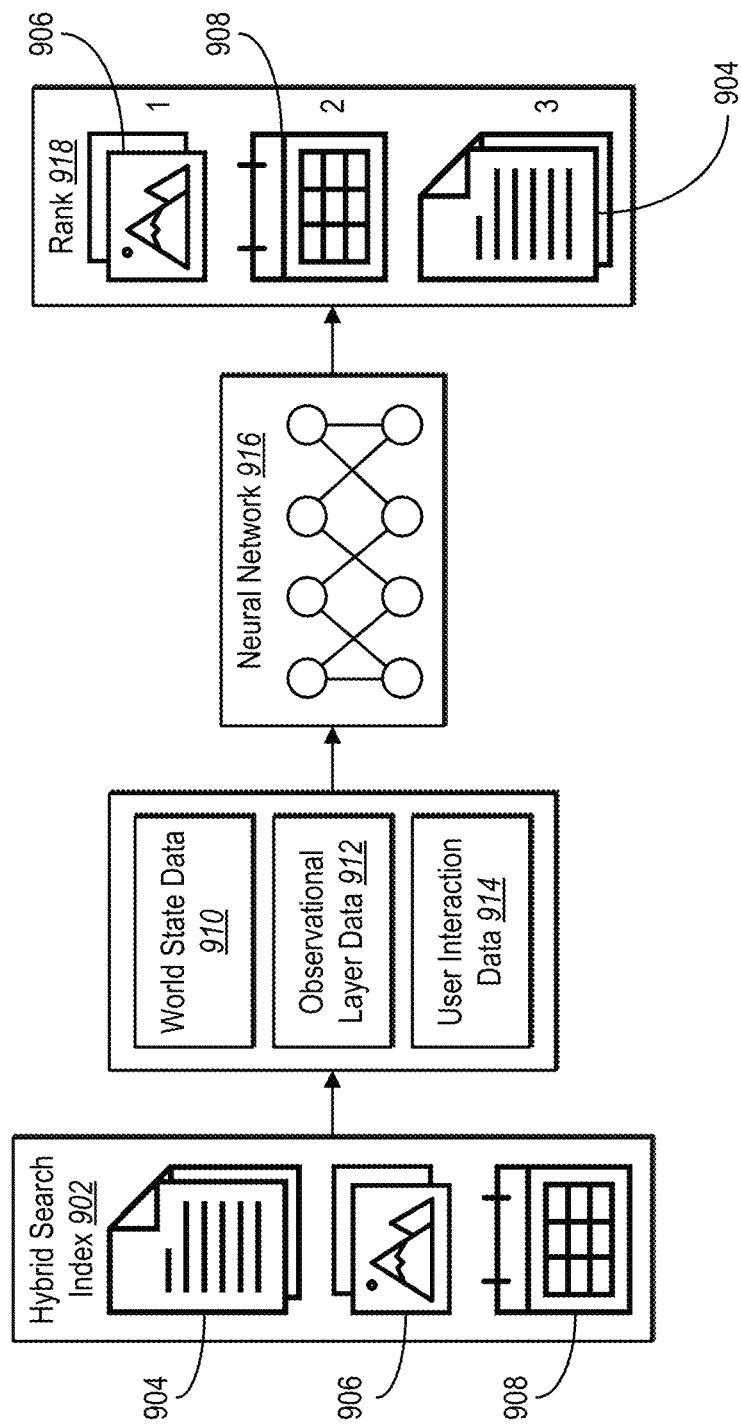
FIG. 9 illustrates the unified search system ranking one or more content items according to world state data, observational layer data, and/or user interaction data in accordance with one or more embodiments.

As just mentioned, the unified search system 106 can rank the one or more content items within a search result according to observation layer data, world state data, and/or user interaction data. FIG. 9 illustrates the unified search system ranking one or more content items according to world state data, observational layer data, and/or user interaction data in accordance with one or more embodiments.

As shown in FIG. 9, a hybrid search index 902 can include one or more content items 904, 906, 908. As indicated in FIG. 9, the hybrid search index can include various types of content items such as text files, audio files, video files, data tables, calendars, etc. Moreover, as discussed above, the unified search system 106 can receive a search query for the hybrid search index 804. In one or more embodiments, the search query can be multi-modal. For example, the unified search system 106 can receive text, imagery, audio, video, and/or other content as part of the search query. To further illustrate, in one or more embodiments, the unified search system 106 can receive a search query that includes a thumbnail image and text requesting similar images.

As further shown and as discussed above, the unified search system 106 can identify world state data 910, observational layer data 912, and/or user interaction data 914 for each content item 904, 906, 908 within the hybrid search index 902 in response to a search query. For example, the unified search system 106 can determine observational layer data 912 from the one or more content items 904, 906, and/or 908. In particular, the unified search system 106 can determine and/or identify historical display locations for the one or more content items 904, 906, 908. For example, in one or more embodiments, the historical display locations can include the historical position, display time, display duration, depth, movement, size, and/or layer of the one or more content items 904, 906, 908. To further illustrate, the unified search system 106 can identify the position and display duration of the content item 906 within a graphical user interface of the client device prior to receiving the search query. Indeed, in one or more embodiments, the unified search system 106 can identify the observational layer data 912 for the one or more content items 904, 906, 908 based on the searchable data and/or metadata tags (e.g., observational metadata tags and/or user interaction metadata tags) within the hybrid search index 902 described above in reference to FIGS. 3-6B.

Additionally, the unified search system 106 can further determine world state data 910 for the one or more content items 904, 906, 908. For instance, the unified search system 106 can determine the world state data 910 defining historic device metrics and environmental metrics corresponding to the one or more content items 904, 906, 908 by searching the hybrid search index 902. In some cases, the unified search system 106 can search historic brightness settings, language settings, fan speed settings, contrast settings, and dark mode settings, device location, environmental lighting conditions, ambient noise, or camera data indicating a position of a user relative to the client device associated with the one or more content items 904, 906, 908. In one or more embodiments, the unified search system 106 can determine the world state data 910 based on the searchable data from the world state data 910 within the hybrid search index 902. To further illustrate, in response to receiving the search query, the unified search system 106 can search the titles of the one or more content items 904, 906, 908, the content of the one or more content items 904, 906, 908 along with the language settings, fan speed settings, etc. associated with the one or more content items 904, 906, 908. For example, the unified search system 106 can identify the contrast settings corresponding to the display of the content item 906 prior to receiving the search query.

As FIG. 9 further shows, the unified search system 106 can determine user interaction data 914 defining historic detected interactions with the one or more content items 904, 906, 908. For example, the unified search system 106 can determine historic accesses, clicks, hovers, navigations, scrolls, zoom-ins, zoom-outs, shares, comments, edits, receipts, moves, deletes, new content creations, clips (e.g., generating content items from other content items), and/or other user interactions over time to determine frequencies, recencies, and/or overall numbers of user interactions with the one or more content items 904, 906, 908. In one or more implementations, once the unified search system 106 receives the search query, the unified search system 106 can search for the one or more content items 904, 906, 908 within the hybrid search index 902 along with the user interaction data corresponding to the one or more content items 904, 906, 908. For example, in some embodiments, the unified search system 106 can determine one or more historical clicks and edits associated with the one or more content items 904, 906, 908.

As discussed above, the unified search system 106 can return one or more content items 904, 906, 908 in response to the search query. As further shown in FIG. 9, the unified search system 106 can further search and/or identify the world state data 910, the observational layer data 912, and/or the user interaction data 914 corresponding the one or more content items 904, 906, 908 to generate a search result. As indicated in FIG. 9, the unified search system 106 can rank or prioritize the one or more content items 904, 904, 908 in the search result based on the world state data 910, the observational layer data 912, and/or the user interaction data 914 of the one or more content items 904, 904, 908.

To elaborate, the unified search system 106 can rank the one or more content items 904, 906, 908 by weighing the one or more content items 904, 906, 908 according to the world state data 910, the observational layer data 912, and/or the user interaction data 914. In some cases, the unified search system 106 can weigh the one or more content items 904, 906, 908 by inputting the world state data 910, the observational layer data 912, and/or the user interaction data 914 into a neural network 916. For example, based on the observational layer data 912 associated with content item 906 indicating that the recent display of the content item 906 (e.g., image) occurred at a prominent position (e.g., central position) of the graphical user interface of the client device for a prolonged time, the neural network 916 can weigh the one or more content items 906 so that the content item 906 is the first content item within a search result corresponding to the search query. Indeed, in one or more embodiments, the unified search system 106 can recognize patterns within the observational layer data defining the historic display of the one or more content items 904, 906, 908. For example, based on detecting a pattern of displaying the content item 908 at a certain time, if the unified search system 106 receives a search query corresponding to the content item 908, the unified search system 106 can weigh the content item 908 so that it has a higher or more prominent rank within the search result. Moreover, in some cases, the unified search system 106 can utilize encoded patterns and/or pathways stored in the hybrid search index to determine the rank the one or more content items 904, 906, 908. For example, based on the patterns of a user account accessing a first content item and shortly thereafter accessing a second content item, the unified search system 106 can increase the rank of the first content item and second content item within the search result.

In one or more embodiments, the unified search system 106 can likewise rank the one or more content items based on the user interaction data 914 for the one or more content items 904, 906, 908 included in the search result. For example, in some implementations, the unified search system 106 can weigh the one or more content items 904, 906, 908 based on the user interaction data 914 defining historic detected interactions with the one or more content items 904, 906, 908 and/or with one or more portions of the one or more content items 904, 906, 908. For example, based on the content item 908 receiving more clicks and edits than the content item 904, the unified search system 106 can utilize the neural network 916 to weight or increase the rank 918 of the content item 908 over the content item 904 (where certain interactions are weighted differently than others, such as modifications or shares more than views or clicks). In one or more embodiments, the unified search system 106 can further consider the timing of the historic detected interactions with the one or more content items 904, 906, 908 and/or with one or more portions of the one or more content items 904, 906, 908. For example, based on the content item 908 receiving more edits than the content item 904 over a week, the neural network 916 can increase the rank 918 or prominence of the content item 908 over the one or more content items 904 within the search results.

As further shown in FIG. 9, the unified search system 106 can rank 918 the one or more content items 904, 906, 908 according to world state data 910 defining historic device metrics and environmental metrics of the one or more content items 904, 906, 908. For example, based on the historic GPS location of the client device while displaying the content item 906, the unified search system 106, via the neural network 916, can increase the rank 918 of the content item 906 within the search result (e.g., a content item viewed on work premises versus a content item viewed at home or vice-versa, depending on the query). As another example, the unified search system 106 can utilize the historic dark mode settings and historic processor performance of the client device associated with the content item 904 to decrease the rank 918 of the content item 904.

As indicated above, in some cases, the unified search system 106 can utilize the world state data 910, the observational layer data 912, and the user interaction data 914 to determine the rank 918 of the one or more content items 904, 906, 908 within the search result. Indeed, the unified search system 106 can utilize historic device metrics and environmental metrics, historic display locations, and historic detected interactions corresponding to the one or more content items 904, 906, 908 to rank 918 the one or more content items 904, 906, 908 included in the search result. In some cases, the unified search system 106 can prioritize the one or more content items 904, 906, 908 within the search result in a way that reflects the needs, interest, and/or contextual understanding of a user account associated with the client device.

In one or more embodiments, the unified search system 106 can utilize heuristic algorithms, metaheuristic algorithms, evolutionary algorithms, probabilistic algorithms, decision trees, or large language models to determine the rank, priority, or weight of the one or more content items 904, 906, 908 based on the world state data 910, the observational layer data 912, and/or the user interaction data 914. For example, the large language model can extract the world state data 910, the observational layer data 912, and/or the user interaction data 914 and weight the one or more content items 904, 906, 908. Additionally, in one or more implementations, the unified search system 106 can utilize the large language model to interpret the search query and utilize the interpretation to inform the ranking of the one or more content items 904, 906, 908. For example, the unified search system 106 can recognize keywords or phrases from the search query and weight the one or more content items 904, 906, 908 based on the presence of the keywords or phrases in the one or more content items 904, 906, 908. In some cases, the unified search system 106 can further rank and/or weight the one or more content items 904, 906, 908 based on the location (e.g., computer application) associated with the one or more content items 904, 906, 908. For example, the unified search system 106 can associate a type of content item and/or type of search query with an external computer application and based on the search query prioritize the one or more content items 904, 906, 908 associated with the external computer application.

Additionally, in one or more embodiments, the unified search system 106 can rank one or more portions of one or more content items 904, 906, 908 (in addition or alternatively to ranking entire content items) within the hybrid search index 902 based on the world state data 910, the observational layer data 912, and/or the user interaction data 914. For example, as described above in FIGS. 3-6B, the unified search system 106 can generate and utilize searchable data from the world state data 910, observational layer data 912, and/or the user interaction data 914 corresponding to one or more portions of the one or more content items 904, 906, 908 within the hybrid search index 902 to determine the rank 918 of the one or more portions of the one or more content items 904, 906, 908.

Figure 10A:
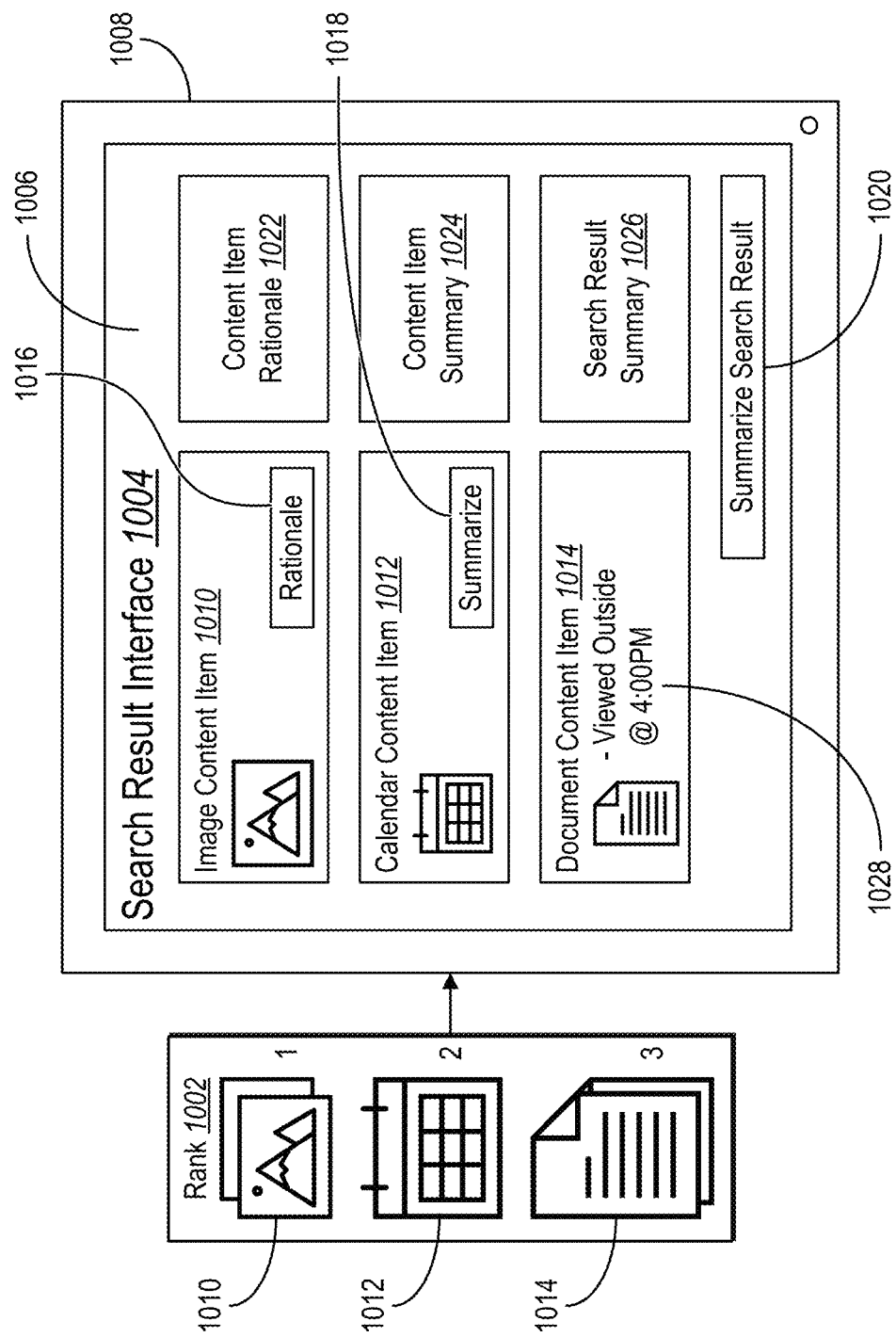
FIGS. 10A-10C illustrate the unified search system providing for display on a client device a search result comprising at least one of one or more ranked content items, a content item rationale, a content item summary, a search result summary, a search result response, an augmented content item, or preview images within a content management system in accordance with one or more embodiments.
Figure 10B:
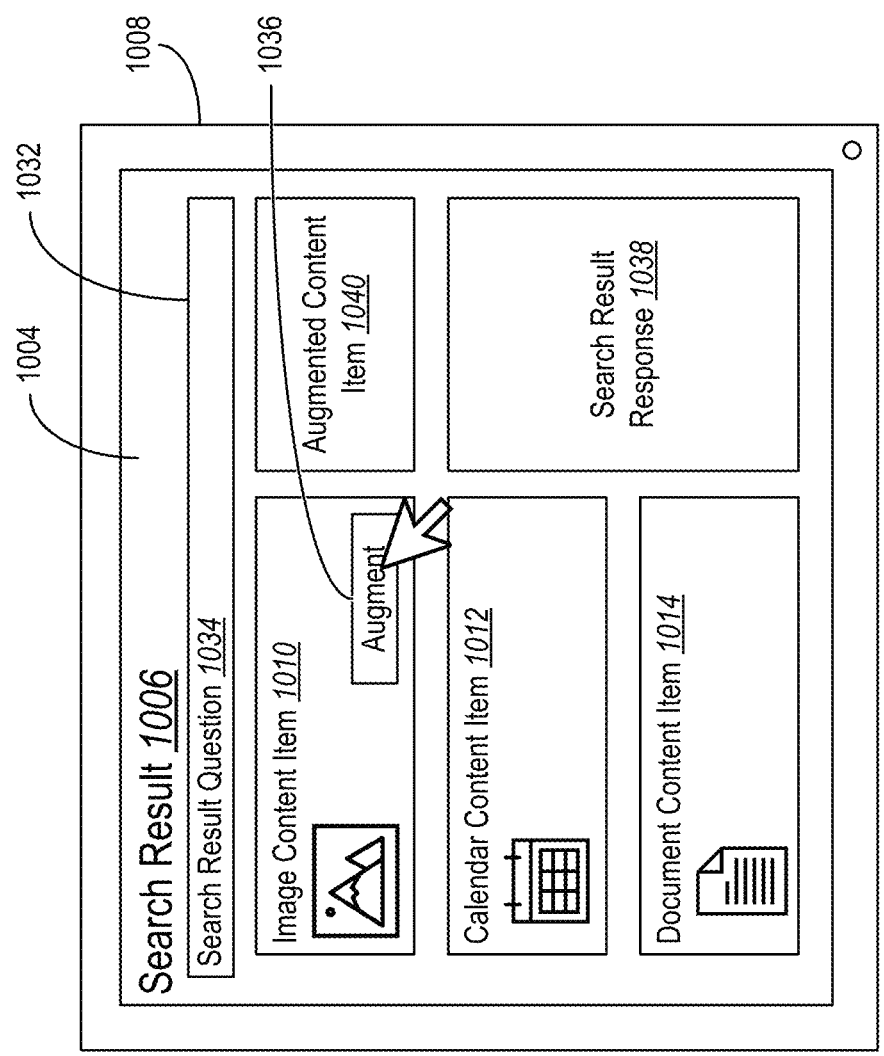
Figure 10C:
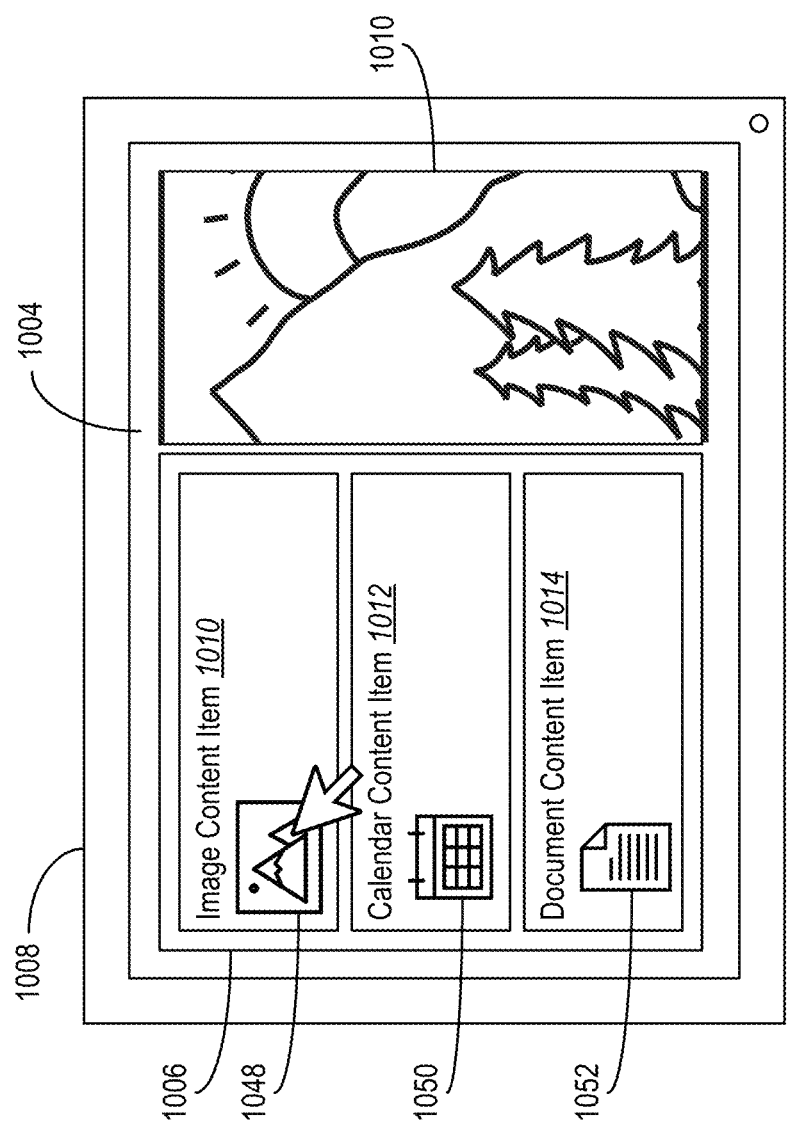

As just discussed, the unified search system 106 can rank the one or more content items and/or one or more portions of the one or more content items within the search results according to observation layer data, world state data, and/or user interaction data. In some cases, the unified search system 106 can provide the search result for display on the client device according to the ranking. Moreover, the unified search system 106 can further provide additional functions, data, and/or information regarding the search result. FIGS. 10A-10C illustrate the unified search system providing for display on a client device a search result comprising at least one of one or more ranked content items, a content item rationale, a content item summary, a search result summary, a search result response, an augmented content item, or preview images within a content management system in accordance with one or more embodiments.

FIG. 10A shows the unified search system 106 providing one or more selectable elements that provide additional context or information about the search result and the one or more content items included in the search result in accordance with one or more embodiments. As shown in FIG. 10A, the unified search system 106 can provide for display, via a client device 1008, a search result interface 1004 displaying the search result 1006. In particular, as shown in FIG. 10A, the unified search system 106 can provide the search result 1006 comprising the content items according to a rank 1002 of the content items based on observational layer data, world state data, and/or user interaction data.

For example, in response to a query requesting "show me the video I was watching on my phone outside," the unified search system 106 can generate the search result 1006 with one or more videos ranked based on the brightness settings, display times, and/or GPS location associated with the one or more videos in the client device 1008. As another example, the unified search system 106 can receive a search query requesting "what are the images that were displayed in my third browser tab relating to piano music?" In response, the unified search system 106 can generate the search result 1006 within the search result interface 1004 that includes the images from the third browser tab at a high or prominent rank based on the display depth, display location, and/or display location associated with the images. In some cases, the search result 1006 can further include related images from the second browser tab based on multiple clicks or edits with the related images in the second browser tab while displaying the images from the third browser tab. Indeed, the unified search system 106 can generate the search result 1006 with one or more content items directly related to the search query or linked to the search query based on the world state data, observational layer data, and/or user interaction data. Indeed, the unified search system 106 provides a powerful tool for effectively and accurately providing a search result with relevant content items.

Along with providing the search result 1006 with one or more content items, the unified search system 106 can provide additional functions via the search result interface 1004. As FIG. 10A illustrates, the unified search system 106 can provide a selectable content item rationale element 1016 for one or more content items from the search result 1006. For example, as shown in FIG. 10A, the unified search system 106 can provide the selectable content item rationale element 1016 for the image content item 1010. In response to receiving a selection of the selectable content item rationale element 1016, the unified search system 106 can generate a content item rationale 1022 indicating the rationale or reasoning for including the image content item 1010 in the search result 1006. In some cases, the content item rationale 1022 can also include the rationale for the rank of the image content item 1010 in the search result 1006.

In some cases, the unified search system 106 can generate the content item rationale 1022 utilizing a large language model. For example, in one or more embodiments, the unified search system 106 can cause the large language model to generate the reasoning for the image content item 1010 based on the observational layer data, the world state data, and/or the user interaction data. To further illustrate, the content item rationale 1022 for the image content item 1010 can indicate that a user recently viewed a similar content item image, and the title (e.g., file name) of the image content item 1010 closely matches the language in the search query. Indeed, the unified search system 106 can utilize the large language model to generate the content item rationale 1022 outlining the factors from the observational layer data, world state data, and/or user interaction data that lead to including the image content item 1010 in the search result 1006.

In some cases, events, activities, or the goals of an organization can affect the rational of the content item rationale 1022. For example, based on upcoming performance reviews, the unified search system 106 can include certain content items related to the search query and upcoming performance reviews in the search result 1006 and indicate in the content item rationale 1022 the reason for including the specific content items in the search result 1006 based on the upcoming performance reviews. Indeed, the unified search system 106 can provide a content item rationale 1022 for each content item within the search result 1006.

Moreover, as shown in FIG. 10A, in one or more embodiments, the unified search system 106 can include an indication 1028 of the observational layer data, world state data, and/or user interaction data that led to including the content item in the search result 1006. For example, as shown in FIG. 10A, the document content item 1014 can include the indication 1028 of the environmental metrics and observation layer data leading to the document content item 1014 being included in the search result 1006. To further illustrate, the unified search system 106 indicate that the unified search system 106 included and ranked the document content item 1014 based on the document content item 1014 being viewed outside at 4:00 pm. In one or more embodiments, the unified search system 106 can include the key observational layer data, world state data, and/or user interaction data that lead to the rank of the one or more content items included in the search result 1006.

As further shown in FIG. 10A, the unified search system 106 can generate a content item summary 1024 for a content item included in the unified search system 106. For example, as FIG. 10A illustrates, the unified search system 106 can further provide for display a selectable content item summarization element 1018 for a calendar content item 1012. In some cases, the unified search system 106 can receive a selection or interaction with the calendar content item 1012, and in response to receiving the selection or interaction with the selectable content item summarization element 1018, the unified search system 106 can display the selectable content item summarization element 1018 within the search result interface 1004. In one or more embodiments, based on receiving a selection of the selectable content item summarization element 1018, the unified search system 106 can generate, utilizing the large language model, the content item summary 1024. For example, the large language model can summarize the appointments and/or deadlines in the calendar content item 1012 in the content item summary 1024.

In some cases, the large language model can summarize one or more portions of the content items. For example, the content item summary 1024 can include a summary for a given week or day within the calendar content item 1012. In some cases, the unified search system 106 can generate one or more content item summaries summarizing the most relevant portions of the one or more content items. For example, based on a specific paragraph within a document corresponding to the search query, the unified search system 106 can utilize the large language model to summarize the specific paragraph within the document.

As further shown in FIG. 10A, the unified search system 106 can provide the content item summary 1024 for display within the search result interface 1004 as part of the search result 1006. In one or more embodiments, the unified search system 106 can generate the content item summary 1024 as part of the search result 1006. For example, the unified search system 106 can automatically generate one or more content item summaries for the one or more content items included in the search result 1006.

In some cases, the unified search system 106 can generate content item summaries for a subset of content items from the one or more content items in the search result 1006. For example, in one or more embodiments, the unified search system 106 can generate content item summaries for the top-k content items included in the search result 1006. In some cases, the content item summaries can also include one or more selectable connections (or links) corresponding to the subset of content items. For example, the content item summary 1024 for the calendar content item 1012 can include a selectable connection linked to the calendar content item 1012. Based on receiving a selection of the selectable connection, the unified search system 106 can pull up the calendar content item 1012 within the content management system 104.

For example, in some cases, the calendar content item 1012 is stored at an external network associated with an external computer application. In such instances, the unified search system 106 is linked to the external computer application via the software connectors and can display the calendar content item 1012 without having to navigate the user to the external computer application. Indeed, the unified search system 106 can provide the calendar content item 1012 for display within a universal web view of the content management system 104. Thus, the unified search system 106 provides an improved and easy-to-use search result interface. Indeed, the unified search system 106 can display content items from across different computer applications in a single space. In one or more embodiments, the unified search system 106 can receive interactions with multiple selectable connections corresponding to multiple content items and, in response, provide the multiple content items within the universal and unified web view of the content management system 104.

As further shown in FIG. 10A, the unified search system 106 can generate a search result summary 1026. In particular, the unified search system 106 can utilize a large language model to generate the search result summary 1026 for a subset of content items from the one or more content items included in the search result 1006. For instance, based on the ranking of the one or more content items, the unified search system 106 can identify a subset of content items from the one or more content items to combine and summarize in the search result summary 1026. For example, the unified search system 106 can cause the large language model to generate the search result summary 1026 for the top-k (e.g., top five, ten, etc.) ranked content items included in the search result 1006 by combining the information, content, and/or data from the top-k ranked content items.

In some embodiments, the unified search system 106 can receive input requesting which content items to include in the search result summary 1026. For example, based on receiving input requesting the search result summary 1026 to include the top five content items, the unified search system 106 can utilize the large language model to generate the search result summary 1026 with a combined summarization of the top five content items. In some cases, the search result summary 1026 can be based on the most relevant portions of the subset of content items. As shown in FIG. 10A, based on the top three ranking of the image content item 1010, the calendar content item 1012, and the document content item 1014, the unified search system 106 can cause the large language model to generate the search result summary 1026 based on the content of the image content item 1010, the calendar content item 1012, and the document content item 1014.

As shown in FIG. 10A, in one or more cases, the unified search system 106 can provide a selectable search result summarization element 1020 to generate the search result summary 1026. For example, based on the unified search system 106 receiving a selection of the selectable search result summarization element 1020, the unified search system 106 can generate the search result summary 1026 that combines content from various content items (e.g., different content item types, similar content item types, related content items) included in the search result 1006. Moreover, the unified search system 106 can display the search result summary 1026 within the search result interface 1004. Indeed, based on receiving a selection of the selectable search result summarization element 1020, the unified search system 106 can determine a number of top ranked (e.g., a top k) content items in a search result from which to generate the search result summary 1026 (e.g., by extracting and summarizing content of the top items). The unified search system 106 can thus quickly and efficiently highlight relevant points, information, or themes related to the search result without requiring a user to sift through individual content items. In some embodiments, the unified search system 106 can automatically display the search result summary 1026 within the search result interface 1004 when generating the search result 1006.

As just discussed, the unified search system 106 can provide certain functions to enhance the search result interface. FIG. 10B illustrates an embodiment of a search result interface where the unified search system 106 augments one or more content items and generates a search result response for a search result question in accordance with one or more embodiments.

As shown in FIG. 10B, the unified search system 106 can provide for display on a client device 1008, a search result interface 1004 with a search result 1006 comprising one or more content items. In some cases, the unified search system 106 can further provide a search result input field 1032 within the search result interface 1004. For example, the search result input field 1032 can allow the unified search system 106 to receive requests, questions, or queries about the one or more content items included in the search result 1006. As shown in FIG. 10B, the unified search system 106 can receive via the search result input field 1032 a search result question 1034 regarding the one or more content items included in the search result interface 1004. For example, the unified search system 106 can receive the search result question 1034 requesting one or more content items that are related and/or similar to the image content item 1010. In some cases, the search result question 1034 can request additional information about the calendar content item 1012. For example, the search result question 1034 can request information about specific dates or events included in the calendar content item 1012.

As further shown in FIG. 10B, the unified search system 106 can provide a search result response 1038 in response to receiving the search result question 1034. For example, the search result response 1038 can include results, answers, and/or information to the search result question 1034. In one or more embodiments, the unified search system 106 utilizes a large language model to generate the search result response 1038. For instance, the search result question 1034 can request a list of meetings related to a specific project within the calendar content item 1012, and the large language model can generate the search result response 1038 that includes the list of meetings along with the dates, times, locations, and/or parties involved with the meetings related to the specific project. Indeed, the unified search system 106 can receive wide-ranging search result questions about the one or more content items within the search result 1006. In some embodiments, the unified search system 106 can receive multiple search result questions about the one or more content items in the search result 1006 and provide multiple search result responses corresponding to the search result questions within the search result interface 1004 of the content management system 104.

In one or more embodiments, the unified search system 106 can enhance or augment one or more content items within the search result 1006. For example, as shown in FIG. 10B, the unified search system 106 can provide for display a selectable content item augmentation element 1036. In some cases, the unified search system 106 can provide the selectable content item augmentation element 1036 for the top-ranked content item (e.g., image content item 1010) within the search result 1006 in response to receiving a selection of the top-ranked content item included in the search result 1006. In some cases, the unified search system 106 can receive a selection of the selectable content item augmentation element 1036 and based on receiving the selection of the selectable content item augmentation element 1036, the unified search system 106 can augment or add information, data, and/or features from one or more content items within the search result 1006 to the image content item 1010 and generate an augmented content item 1040.

For example, in one or more embodiments, augmenting the image content item 1010 with information from the document content item 1014 can include adding a description based on the information in the document content item 1014 to the image content item 1010. To further illustrate, the image content item 1010 can be a primary image used in a marketing campaign, the calendar content item 1012 can include important deadlines, marketing launch dates, and/or marketing research report dates, and the document content item 1014 can include the goals, purposes, and targeted audience for the marketing campaign.

Based on receiving a selection of the selectable content item augmentation element 1036, the unified search system 106 can add the important deadlines and marketing launch dates from the calendar content item 1012, and the goals outlined in the document content item 1014 to the image content item 1010 and generate the augmented content item 1040 for the image content item 1010. Thus, in some cases, the unified search system 106 can add information for one or more lower-ranked content items to the top-ranked content item. In some embodiments, the unified search system 106 can receive user input indicating which content items within the search result 1006 to use while augmenting the content item. For example, the unified search system 106 can receive user input indicating that the unified search system 106 should add information from the calendar content item 1012 to the image content item 1010 to generate the augmented content item 1040. In one or more implementations, the unified search system 106 can augment one or more content items within the search result 1006.

Additionally, in some embodiments, the unified search system 106 can enhance the one or more content items in the search result 1006. For example, the unified search system 106 can identify and correct typos within the one or more content items in the search result 1006. In some cases, the unified search system 106 can rephrase portions of the one or more content items within the search result 1006 to clarify and/or highlight parts of the one or more content items.

As just discussed, the unified search system 106 can include additional features for the one or more content items within the search result. FIG. 10C provides an exemplary graphical user interface for providing preview images for the one or more content items included in the search result in accordance with one or more embodiments.

As shown in FIG. 10C, the unified search system 106 can provide the one or more content items included in the search result 1006 within the search result interface 1004 on the client device 1008. In one or more embodiments, the unified search system 106 can further provide one or more preview images for the one or more content items included in the search result 1006. For example, as shown in FIG. 10C, the unified search system 106 can provide a preview image 1048 for the image content item 1010.

In some cases, the search result 1006 can include the titles or file names of the one or more content items included in the search result 1006 along with the preview images for the one or more content items within the search result 1006. For example, as shown in FIG. 10C, the unified search system 106 can provide a preview image 1048 (or thumbnail) that represents the larger image of the image content item 1010. Likewise, as shown in FIG. 10C, the unified search system 106 can provide a calendar preview image 1050 for the calendar content item 1012 and a document preview image 1052 for the document content item 1014. Indeed, in some cases, the preview image can help identify the type of content item (e.g., image, video, audio, document, etc.) included in the search result 1006.

In one or more embodiments, the unified search system 106 can receive a selection or interaction with one or more preview images for the one or more content items within the search result 1006. For instance, as further shown in FIG. 10C, the unified search system 106 can receive a selection of the preview image 1048 associated with the image content item 1010. Based on receiving the selection of the preview image 1048, the unified search system 106 can provide for display the image content item 1010 within the content management system 104 by displaying a larger or full-size version of the image content item 1010 within the content management system 104. Indeed, the unified search system 106 can utilize the software connectors described above, to surface the image content item 1010 without navigating to the external computer application where the image content item 1010 is stored at an external network location associated with the external computer application. Moreover, in one or more embodiments, the unified search system 106 can allow a user to edit the image content item 1010 within the content management system 104.

Figure 11:
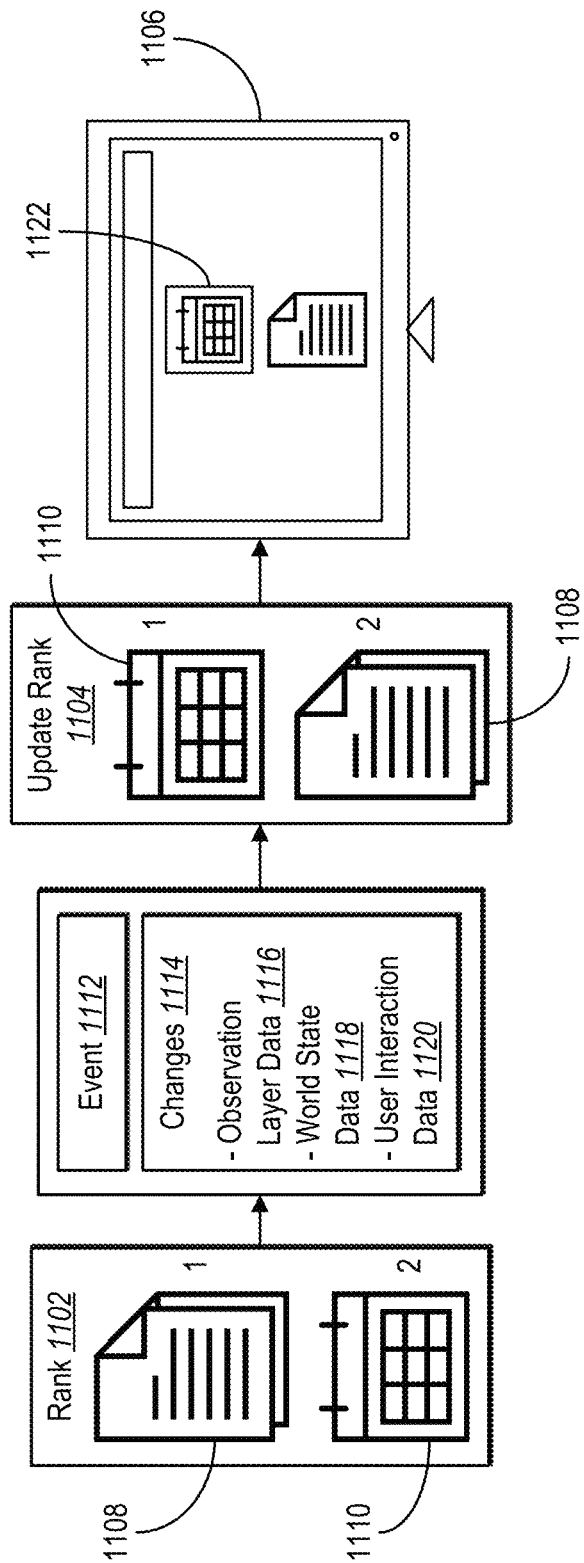
FIG. 11 illustrates the unified search system updating the ranking of one or more content items in a search result in accordance with one or more embodiments.

As discussed above, the unified search system 106 can rank the one or more content items within the search result to provide relevant content items that correspond to a search query based on observational layer data, world state data, and/or user interaction data. In some cases, the unified search system 106 can update or change the rank of one or more content items based on events associated with a user account or organization. FIG. 11 illustrates the unified search system updating the ranking of one or more content items in a search result in accordance with one or more embodiments.

As shown in FIG. 11 and discussed above, the unified search system 106 can determine a rank 1102 for the one or more content items 1108, 1110 within a search result. As further indicated, in one or more embodiments, the unified search system 106 can determine and/or identify an event 1112 specific to an entity and update the rank based on the event 1112. For example, the unified search system 106 can determine important and/or key events for the specific entity based on historical information. In one or more embodiments, the unified search system 106 can determine annual performance reviews based on historical events, documents, and/or other information discussing annual performance reviews during a certain time period. For example, based on calendar events related to annual performance reviews occurring at the beginning of December, the unified search system 106 can determine that annual performance reviews for the upcoming year will occur at the beginning of December. Indeed, in one or more embodiments, the unified search system 106 can use historic and/or current information from one or more content items to determine specific events for an entity and as discussed in more detail below, update the rank of the one or more content items 1108, 1110 based on the event.

As further shown in FIG. 11, the unified search system 106 can further detect one or more changes 1114 to the observation layer data 1116, world state data 1118, and/or user interaction data 1120 after receiving a search query and providing one or more content items in the search result and update the rank based on those changes. For example, the unified search system 106 can detect changes to the observation layer data 1116 by detecting changes to the position, display time, display duration, depth, movement, size, and/or layer of the content items 1108, 1110 for a period of time after receiving the search query. For instance, the unified search system 106 can further monitor the observation layer data 1116 for five minutes or other amount of time after receiving the search query. Further, in one or more embodiments, the unified search system 106 can detect the display, display duration, movement, etc., of the new content items and/or the one or more content items 1108, 1110 included in the search result and update the rank and/or add one or more additional content items to include in the updated search result 1122 based one or more changes to the observation layer data 1116 for the period of time. For example, based on detecting a central display of a new content item, the unified search system 106 can generate the updated search result 1122 by including one or more additional content items for the search query based on detecting the central display of the new content item. Alternatively, the unified search system 106 can generate the updated search result 1122 by removing one or more content items based on the one or more changes to the observation layer data 1116.

In one or more embodiments, where the unified search system 106 ranks the one or more content items on the observation layer data 1116, the unified search system 106 can further receive world state data 1118 and/or user interaction data 1120 corresponding to the one or more content items 1108, 1110 and/or one or more portions of the one or more content items 1108, 1110. In some cases, the unified search system 106 can further update the rank 1104 of the one or more content items 1108, 1110 and/or one or more portions of the one or more content items 1108, 1110 based on considering the world state data 1118 and/or user interaction data 1120 along with the observation layer data 1116. Indeed, in one or more implementations, the unified search system 106 can rank and/or update the one or more content items 1108, 1110 based on at least one of the observation layer data 1116, the world state data 1118, or the user interaction data 1120.

In one or more embodiments, the unified search system 106 can detect changes to the world state data 1118 by detecting one or more changes to the device metrics and/or the environmental metrics. For example, the unified search system 106 can detect changes to the internal device temperature, fan speed, and screen brightness of the device along with changes to the environmental lighting conditions, ambient noise, and/or camera data indicating a changed position of a user relative to the client device. Additionally, in one or more embodiments, the unified search system 106 can detect changes to the user interaction data 1120 by detecting one or more changes to selections, text input, cursor movements, cursor locations, swipes, scrolling, navigation, etc. with the one or more content items, input fields, and/or computer applications within the graphical user interface and/or the search result interface of the client device after receiving the search query.

As further shown in FIG. 11, the unified search system 106 can update the rank 1104 based on the event and/or one or more changes to the observation layer data 1116, the world state data 1118, and/or the user interaction data 1120. In some cases, the unified search system 106 can input the changes to the observation layer data 1116, world state data 1118, and/or the user interaction data 1120 into a neural network, large language model, or decision tree to determine the updated rank. For example, based on the occurrence of the event 1112 specific to the entity, the unified search system 106 can update the ranking of the one or more content items 1108, 1110 corresponding to the search query for the entity. For example, as discussed above, the unified search system 106 can determine the event of annual performance reviews for the entity occurring at a certain date. Moreover, in one or more embodiments, based on the occurrence of the annual performance reviews, the unified search system 106 can update the rank 1104 of the one or more content items 1110, 1108 to promote or highlight the content item 1110 because it more closely relates to the annual performance reviews. Indeed, the unified search system 106 can identify and/or determine time-sensitive events and provide the one or more ranked content items relating to the time-sensitive event. For example, based on the occurrence of a meeting for a specific project, the unified search system 106 can, in response to a search query, provide and rank one or more content items that correspond to the search query and rank and/or update the rank of the one or more content items in a manner that highlights and provides within the search result the most relevant content items corresponding to the meeting. Similarly, in one or more embodiments, the unified search system 106 can update the rank 1102 of one or more portions of the one or more content items 1108, 1110 based on the event 1112 and/or changes to the observation layer data 1116, the world state data 1118, and/or the user interaction data 1120.

Additionally, in some cases, the unified search system 106 can monitor the observation layer data 1116 and/or the user interaction data 1120 related to the one or more content items 1108, 1110 within the search result. In particular, the unified search system 106 can utilize the observation layer data 1116 and/or the user interaction data 1120 related to the one or more content items 1108, 1110 within the search result to update the rank of the one or more content items 1108, 1110. For example, based on receiving a selection of a lower-ranked content item, the unified search system 106 can increase the rank of the lower-ranked content item.

As indicated above, the unified search system 106 can provide the updated search result 1122 for display on the client device 1106 with the one or more content items 1108, 1110 and/or one or more portions of the one or more content items 1108, 1110 in an updated ranked order within a search result interface. Indeed, based on updating the ranking of the one or more content items 1108, 1110 and/or one or more portions of the one or more content items 1108, 1110, the unified search system 106 can display the updated search result 1122 with the one or more content items 1108, 1110 and/or one or more portions of the one or more content items 1108, 1110 in the updated rank order within the search result interface. Indeed, in some cases, when the unified search system 106 ranks one or more portions of the one or more content items 1108, 1110, the unified search system 106 can provide for display on the client device the one or more portions of the one or more content items in an updated ranked order within the search result interface.

Figure 12:
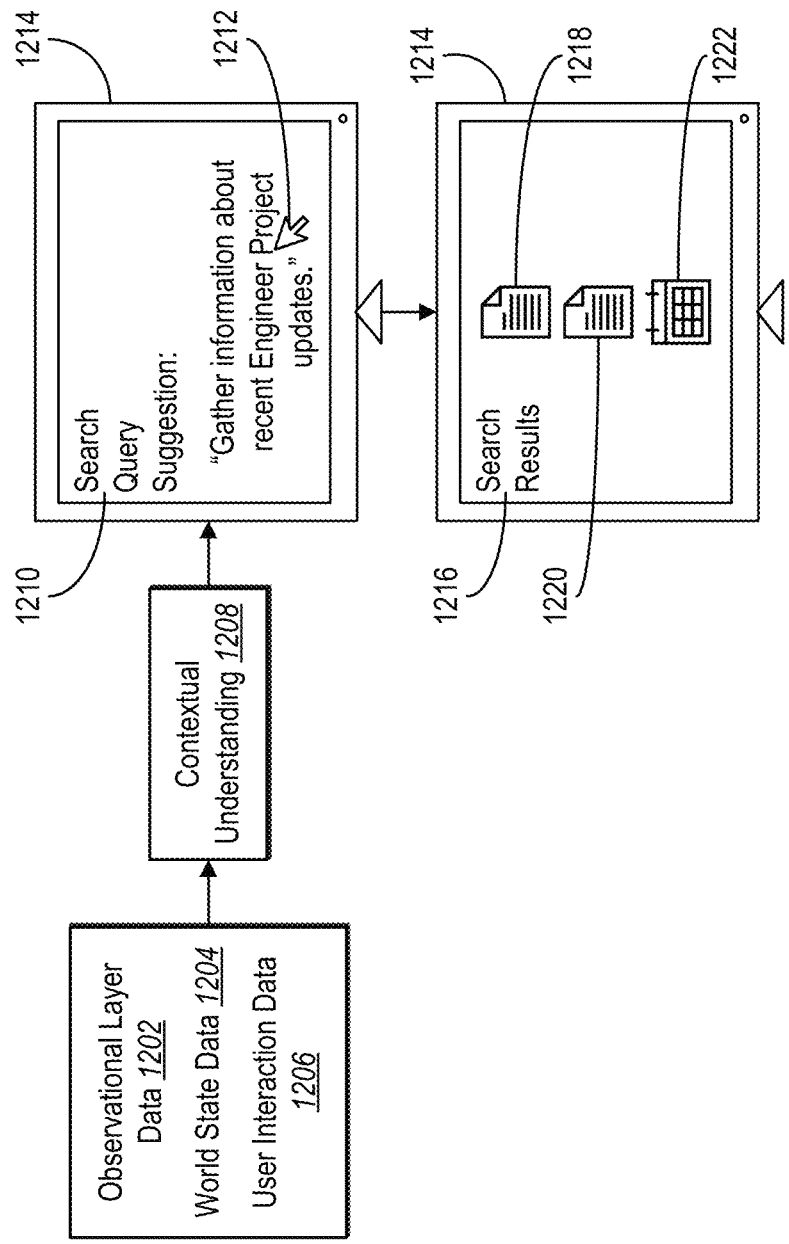
FIG. 12 illustrates a unified search system generating a search query suggestion in accordance with one or more embodiments.

As discussed above, the unified search system 106 can receive one or more search queries to a hybrid search index. In some cases, the unified search system 106 can further generate one or more search query suggestions for an entity to provide one or more relevant content items in the search result that corresponds to the search query. FIG. 12 illustrates a unified search system 106 generating a search query suggestion in accordance with one or more embodiments.

As shown in FIG. 12, the unified search system 106 can generate one or more search query suggestions based on a contextual understanding 1208 of an entity. For instance, in one or more embodiments, the unified search system 106 can determine the contextual understanding 1208 of the entity based on at least one of the observational layer data 1202, the world state data 1204, and/or the user interaction data 1206. For example, the unified search system 106 can determine goals, events, environments, and/or information related to the entity that builds the contextual understanding 1208 indicating the significance of certain events, topics, and/or subjects for the entity (e.g., organization, group, user account) at a given moment. In some cases, the unified search system 106 utilizes a neural network, algorithm, or large language model to determine the contextual understanding 1208 of the entity. For example, the unified search system 106 can input the observational layer data 1202, the contextual understanding 1208, and/or the user interaction data 1206 into the neural network or heuristic algorithm to determine the goals, subjects, industry, history, changes, and/or topics relevant to and/or regarding the entity.

In one or more cases, the unified search system 106 can utilize the contextual understanding 1208 to improve the efficacy and accuracy of a search result 1216 corresponding to a search query. For example, as shown in FIG. 12, the unified search system 106 can generate a search query suggestion 1210 for the entity based on the contextual understanding 1208 of the entity. For example, in one or more embodiments, based on the user interaction data 1206 and observational layer data 1202 of one or more content items concerning and/or related to the progress, deadlines, and goals of one or more engineering projects, the unified search system 106 can generate the search query suggestion 1210 of "Gather information about recent engineer project updates." Moreover, as shown in FIG. 12, the unified search system 106 can provide for display the search query suggestion 1210 on a graphical user interface or search result interface of the client device 1214. In some cases, the unified search system 106 utilizes a large language model to generate the search query suggestion 1210. For example, the unified search system 106 can generate the search query suggestion 1210 by providing the contextual understanding 1208 to the large language model.

In some cases, the unified search system 106 can generate one or more search query suggestions targeting different aspects of themes, subjects, and/or events related to the contextual understanding 1208 of the entity. For example, in one or more embodiments, the unified search system 106 can generate additional search query suggestions, such as "Deadline file for engineering project Cleo" or "Draft images for engineering projects Cleo and Orion" based on the observational layer data 1202 and the user interaction data 1206 reflecting the contextual understanding 1208 of an entity (e.g., user account) being focused on certain engineering projects within an organization.

As further shown in FIG. 12, the unified search system 106 can receive a selection 1212 of the search query suggestion 1210, "Gather information about recent engineer project updates," and rank one or more content items 1218, 1220, 1222 based on the observational layer data 1202, the contextual understanding 1208, and/or the user interaction data 1206. Moreover, the unified search system 106 can provide for display the search result 1216 comprising one or more content items 1218, 1220, 1222 in ranked order within the search result interface.

Figure 13:
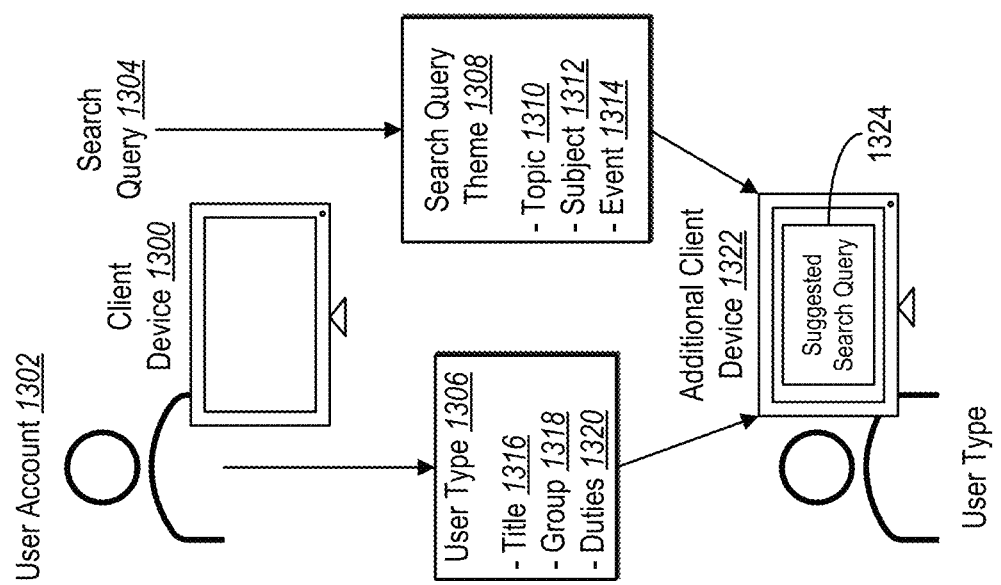
FIG. 13 illustrates the unified search system providing for display on a client device a suggested search query associated with a user type in accordance with one or more embodiments.

As just discussed, the unified search system 106 can determine a contextual understanding for an entity and generate a suggested search query. In some cases, the unified search system 106 can further personalize a search result for a search query to a hybrid search index by providing a suggested search query with a search query theme that is associated with a user type. FIG. 13 illustrates the unified search system 106 providing for display on a client device a suggested search query associated with a user type in accordance with one or more embodiments.

As shown in FIG. 13, the unified search system 106 can identify a user type 1306 for a user account 1302 associated with a client device 1300. In particular, the unified search system 106 can identify a title 1316, group 1318, and/or duties 1320 indicating or associated with a position and/or functions of an individual of the user account 1302 associated with an entity (e.g., organization, group, etc.). For example, the unified search system 106 can determine that the user type 1306 of the user account 1302 corresponds to an Engineer II position within an engineering firm based on the Engineer II title and/or product design and development duties tied to the user account 1302.

Additionally, as indicated in FIG. 13, the unified search system 106 can identify a search query theme 1308 for the search query 1304. For example, the unified search system 106 can determine if the search query theme 1308 for the search query 1304 relates to a topic 1310, subject 1312, or event 1314. For example, the unified search system 106 can determine the search query theme 1308 for the search query 1304 based on the language and/or intent of the search query 1304. For example, based on the search query 1304 requesting files related to an engineering project, "Project Luna," the unified search system 106 can determine, utilizing a large language model, that the search query theme 1308 for the search query is "Project Luna." Indeed, the unified search system 106 can monitor the language and/or intent of received search queries and determine if they relate to a certain topic 1310, subject 1312, and/or event 1314.

As further shown in FIG. 13, the unified search system 106 can associate the user type 1306 with the search query theme 1308. In particular, the unified search system 106 can recognize search query themes 1308 commonly made by the user type 1306. For example, the unified search system 106 can associate an Engineer II user type with the "Project Luna" search query theme. In some cases, the unified search system 106 can associate the user type 1306 with various search query themes 1308. For example, the unified search system 106 can associate the Engineer II user type with search query themes 1308 about researching a specific technology, attending a specific event, and/or performing a certain task.

As further indicated in FIG. 13, the unified search system 106 can identify the user type 1306 on an additional client device 1322. In particular, the unified search system 106 can detect a user account logged on to the additional client device 1322 and identify the user type 1306 related to the user account 1302. In one or more embodiments, based on identifying the user type 1306 on the additional client device 1322, the unified search system 106 can generate, via a large language model, a suggested search query 1324 corresponding to the search query theme 1308. For example, based on detecting an Engineer II user type logged onto the additional client device 1322, the unified search system 106 can generate the suggested search query 1324 of "Pull engineering specifications for Project Luna," based on other Engineer II user types making search queries regarding Project Luna.

As further shown in FIG. 13, the unified search system 106 can provide for display on the additional client device 1322, the suggested search query 1324 corresponding to the search query theme. For example, within the content management system 104, the unified search system 106 can display the suggested search query 1324 and in response to receiving a selection of the suggested search query 1324, the unified search system 106, as described above, can generate a search result with one or more content items corresponding to the suggested search query 1324.

FIGS. 8-13, the corresponding text, and the examples provide a number of different systems and methods for generating search results from a hybrid index in accordance with one or more embodiments. In addition to the foregoing, implementations can also be described in terms of flowcharts comprising acts steps in a method for accomplishing a particular result. For example, FIG. 14 illustrates an example series of acts for generating a search result from a hybrid index in accordance with one or more embodiments.

Figure 14:
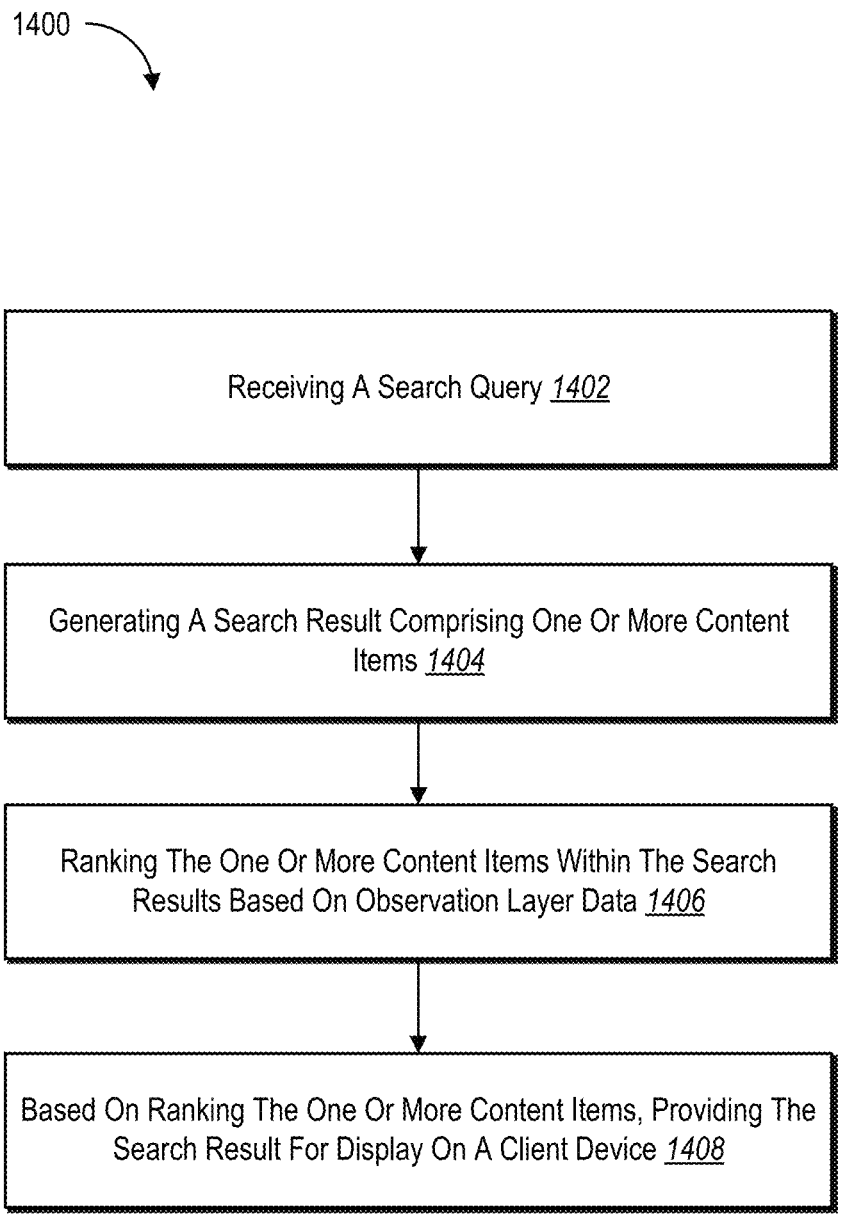
FIG. 14 illustrates an example flowchart of a series of acts for generating a search result in accordance with one or more embodiments.

As illustrated in FIG. 14, the series of acts 1400 may include an act 1402 of receiving a search query. For example, in one or more embodiments, the act 1402 can include receiving, from a client device, a search query for searching a hybrid search index. In addition, the series of acts 1400 includes an at 1404 of generating a search result comprising one or more content items. For instance, in one or more implementations, the series of acts 1400 includes in response to the search query, generating, from the hybrid search index, a search result comprising one or more content items corresponding to the search query. Furthermore, in some cases, the series of acts 1400 includes an act 1406 of ranking the one or more content items within the search results based on observation layer data. For example, in some cases, the act 1406 can include ranking the one or more content items within the search result according to observation layer data defining historical display locations of the one or more content items included in the search result. As further shown in FIG. 14, the series of acts 1400 can include an act 1408 of based on raking the one or more content items, providing the search results for display on a client device. For instance, in some implementations, the act 1408 can include based on ranking the one or more content items, providing the search result for display on the client device in ranked order within a search result interface.

Further, in one or more embodiments, the series of acts 1400 includes ranking the one or more content items according to world state data defining device metrics and environmental metrics of the one or more content items and user interaction data corresponding to the one or more content items.

Furthermore, in some implementations, the series of acts 1400 includes determining an event specific to an entity. In one or more embodiments, the series of acts 1400 includes based on an occurrence of the event, updating the ranking of the one or more content items corresponding to the search query for the entity. Additionally, in some cases, the series of acts 1400 can include based on updating the ranking of the one or more content items, providing the search result for display on the client device in an updated ranked order within the search result interface.

Moreover, in one or more embodiments, the series of acts 1400 includes generating, utilizing a large language model, a content item summary for one or more content items. Additionally, the series of acts 1400 can include providing the content item summary for display on the client device as part of the search result.

Furthermore, in one or more implementations, the series of acts 1400 includes identifying a subset of content items from the one or more content items included in the search result based on a ranking of the one or more content items in the search result. Additionally, in some cases, the series of acts 1400 includes generating, utilizing a large language model, a search result summary comprising a combined summarization of the subset of content items.

In some cases, the series of acts 1400 can include generating, utilizing a large language model, a content item rational indicating a rational for including the one or more content items in the search result. Moreover, the series of acts 1400 can include providing the content item rational for display on the client device within the search result interface.

In some embodiments, the series of acts 1400 can include an act where the search query comprises at least one of text, imagery, or video.

In one or more cases, the series of acts 1400 can include receiving, from a client device, a search query for searching a hybrid search index. Additionally, the series of acts 1400 can include in response to the search query, generating, from the hybrid search index, a search result comprising one or more content items corresponding to the search query. In some implementations, the series of acts 1400 can include ranking the one or more content items within the search result based on weighing the one or more content items according to observation layer data defining historical display locations of the one or more content items included in the search result. Furthermore, in some embodiments, the series of acts 1400 can include based on ranking the one or more content items, providing the search result for display on the client device in ranked order within a search result interface.

In some cases, the series of acts 1400 can include further ranking the one or more content items within the search result according to user interaction data defining one or more detected interactions with the one or more content items.

In one or more embodiments, the series of acts 1400 includes determining a contextual understanding of an entity based on at least one of observation layer data, world state data, or user interaction data. In some cases, the series of acts 1400 can include based on the contextual understanding, generating one or more search query suggestions corresponding to the entity. Additionally, in one or more implementations, the series of acts 1400 can include in response to receiving a selection of the one or more search query suggestions, providing the search result for display on the client device.

Further, in some cases, the series of acts 1400 can include determining one or more changes to the observation layer data for a period of time after receiving the search query. Moreover, in one or more embodiments, the series of acts 1400 includes generating an updated search result comprising one or more additional content items for the search query based on the one or more changes to the observation layer data for the period of time. In one or more implementations, the series of acts 1400 can include providing the updated search result for display on the client device.

Additionally, in one or more embodiments, the series of acts 1400 includes receiving from a search result input field within the search result interface, a search result question regarding one or more content items included in the search result. Furthermore, in some cases, the series of acts 1400 includes generating, utilizing a large language model, a search result response corresponding to the search result question. In one or more cases, the series of acts 1400 can include providing the search result response corresponding to the search result question within the search result interface.

Furthermore, in some implementations, the series of acts 1400 can include providing one or more preview images for the one or more content items included in the search result. In one or more cases, the series of acts 1400 can include based on receiving a selection of a preview image from the one or more preview images for the one or more content items, providing for display on the client device a content item corresponding to the selected preview image within a content management system.

Moreover, in one or more implementations, the series of acts 1400 can include receiving from the client device a selection of a top ranked content item included in the search result. In addition, in some cases, the series of acts 1400 can include providing for display on the client device a selectable content item augmentation element. Furthermore, the series of acts 1400 can include based on receiving a selection of the selectable content item augmentation element, adding information from one or more lower ranked content items to the top ranked content item.

Further, in one or more implementations, the series of acts 1400 can include receiving, from a client device, a search query for searching a hybrid search index. Additionally, the series of acts 1400 can include in response to the search query, generating, from the hybrid search index, a search result comprising one or more portions of one or more content items corresponding to the search query. Moreover, in some cases, the series of acts 1400 includes ranking the one or more portions of the one or more content items within the search result according to observation layer data defining historical display locations of the one or more portions of the one or more content items included in the search result. In one or more embodiments, the series of acts 1400 can include based on ranking the one or more portions of the one or more content items, providing the search result for display on the client device in ranked order within a search result interface.

Additionally, in one or more embodiments, the series of acts 1400 includes receiving a selection of a content item included in the search result. Moreover, in some cases, the series of acts 1400 can include providing for display on the client device a selectable content item summarization element corresponding to the selected content item within the search result interface. In one or more embodiments, the series of acts 1400 can include based on receiving a selection of the selectable content item summarization element, generating, utilizing a large language model, a content item summary for the selected content item. In some cases, the series of acts 1400 can include providing the content item summary for display on the client device.

Moreover, in one or more implementations, the series of acts 1400 can include ranking the one or more content items within the search query according to user interaction data defining one or more detected interactions with the one or more portions of the one or more content items.

In some cases, the series of acts 1400 can include identifying a user type for a user account associated with the client device and a search query theme for the search query. Additionally, in one or more implementations, the series of acts 1400 includes associating the user type with the search query theme. In one or more embodiments, the series of acts 1400 can include based on identifying the user type on an additional client device, provide for display on the additional client device, a suggested search query corresponding to the search query theme.

Furthermore, in some embodiments, the series of acts 1400 can include receiving world state data defining device metrics and environmental metrics of the one or more portions of the one or more content items and user interaction data corresponding to the one or more portions of the one or more content items. In one or more implementations, the series of acts 1400 includes updating the rank of the one or more portions of the one or more content items based on the world state data and the user interaction data. Additionally, the series of acts 1400 can include based on updating the rank of the one or more portions of the one or more content items, providing an updated search result for display on the client device in an updated ranked order within the search result interface.

Moreover, in one or more implementations, the series of acts 1400 can include generating, utilizing a large language model, a content item summary for a subset of content items from the one or more content items included in the search result, wherein, the content item summary includes one or more selectable connections corresponding to the subset of content items. Additionally, in some embodiments, the series of acts 1400 includes based on receiving an interaction with a selectable connection, providing for display within a content management system a content item from the subset of content items corresponding to the selectable connection.

In one or more implementations, each of the components of the unified search system 106 are in communication with one another using any suitable communication technologies. Additionally, the components of the unified search system 106 can be in communication with one or more other devices including one or more client devices described above. It will be recognized that in as much the unified search system 106 is shown to be separate in the above description, any of the subcomponents may be combined into fewer components, such as into a single component, or divided into more components as may serve a particular implementation.

Figure 15:
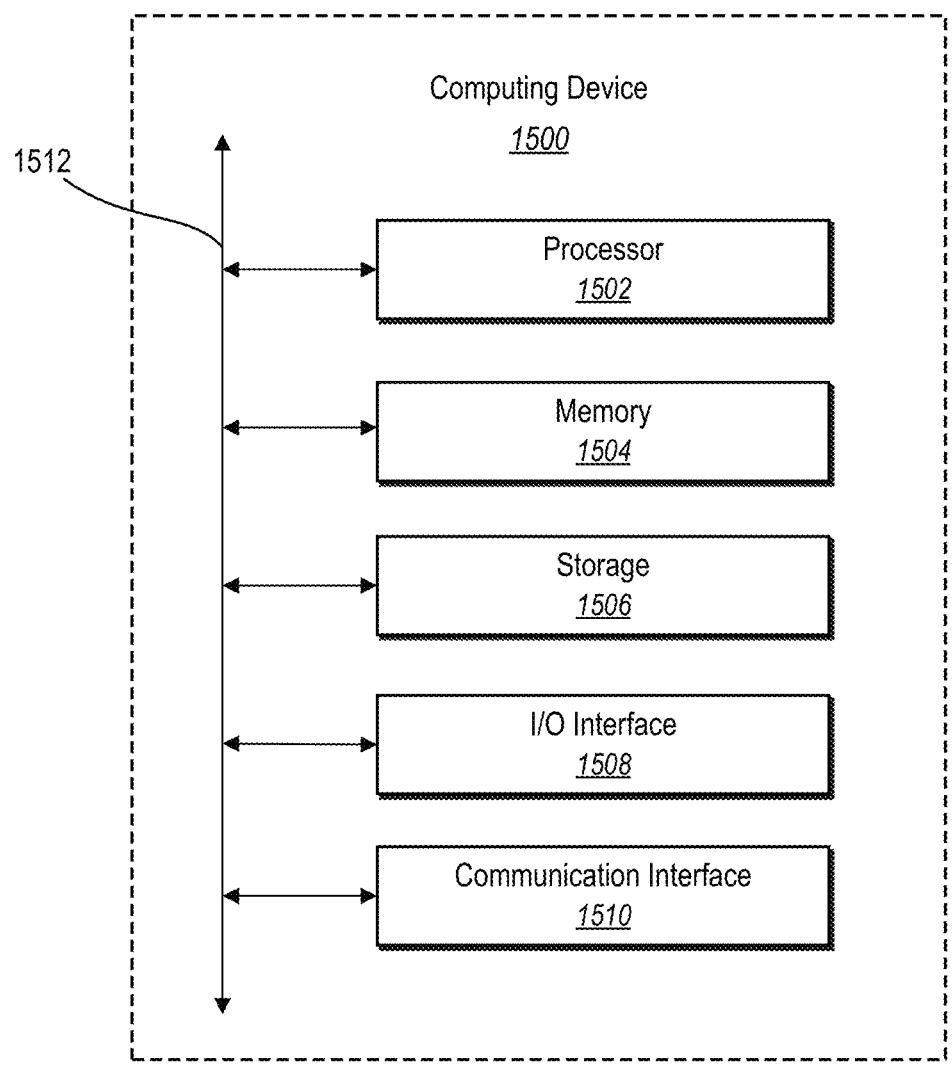
FIG. 15 illustrates a block diagram of an exemplary computing device in accordance with one or more embodiments.

FIG. 15 illustrates a block diagram of exemplary computing device 1500 that may be configured to perform one or more of the processes described above. The components of the unified search system 106 can include software, hardware, or both. For example, the components of the unified search system 106 can include one or more instructions stored on a computer-readable storage medium and executable by processors of one or more computing devices (e.g., the computing device 1500). When executed by the one or more processors, the computer-executable instructions of the unified search system 106 can cause the computing device 1500 to perform the methods described herein. Alternatively, the components of the unified search system 106 can comprise hardware, such as a special purpose processing device to perform a certain function or group of functions. Additionally, or alternatively, the components of the unified search system 106 can include a combination of computer-executable instructions and hardware.

Furthermore, the components of the unified search system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the unified search system 106 may be implemented as part of a stand-alone application on a personal computing device or a mobile device.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

As mentioned, FIG. 15 illustrates a block diagram of exemplary computing device 1500 that may be configured to perform one or more of the processes described above. One will appreciate that third-party server(s) 102, the client device 110, and/or the computing device 1500 may comprise one or more computing devices such as computing device 1500. As shown by FIG. 15, computing device 1500 can comprise processor 1502, memory 1504, a storage device, a I/O interface, and communication interface 1510, which may be communicatively coupled by way of communication infrastructure 1512. While an exemplary computing device 1500 is shown in FIG. 15, the components illustrated in FIG. 15 are not intended to be limiting. Additional or alternative components may be used in other implementations. Furthermore, in certain implementations, computing device 1500 can include fewer components than those shown in FIG. 15. Components of computing device 1500 shown in FIG. 15 will now be described in additional detail.

In particular implementations, processor 1502 includes hardware for executing instructions, such as those making up a computer program. As an example, and not by way of limitation, to execute instructions, processor 1502 may retrieve (or fetch) the instructions from an internal register, an internal cache, memory 1504, or storage device 1506 and decode and execute them. In particular implementations, processor 1502 may include one or more internal caches for data, instructions, or addresses. As an example, and not by way of limitation, processor 1502 may include one or more instruction caches, one or more data caches, and one or more translation lookaside buffers (TLBs). Instructions in the instruction caches may be copies of instructions in memory 1504 or storage device 1506.

Memory 1504 may be used for storing data, metadata, and programs for execution by the processor(s). Memory 1504 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. Memory 1504 may be internal or distributed memory.

Storage device 1506 includes storage for storing data or instructions. As an example, and not by way of limitation, storage device 1506 can comprise a non-transitory storage medium described above. Storage device 1506 may include a hard disk drive (HDD), a floppy disk drive, flash memory, an optical disc, a magneto-optical disc, magnetic tape, or a Universal Serial Bus (USB) drive or a combination of two or more of these. Storage device 1506 may include removable or non-removable (or fixed) media, where appropriate. Storage device 1506 may be internal or external to computing device 1500. In particular implementations, storage device 1506 is non-volatile, solid-state memory. In other implementations, Storage device 1506 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1508 allows a user to provide input to, receive output from, and otherwise transfer data to and receive data from computing device 1500. I/O interface 1508 may include a mouse, a keypad or a keyboard, a touch screen, a camera, an optical scanner, network interface, modem, other known I/O devices or a combination of such I/O interfaces. I/O interface 1508 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1508 is configured to provide graphical data to a display for presentation to a user. The graphical data may be representative of one or more graphical interfaces and/or any other graphical content as may serve a particular implementation.

Communication interface 1510 can include hardware, software, or both. In any event, communication interface 1510 can provide one or more interfaces for communication (such as, for example, packet-based communication) between computing device 1500 and one or more other computing devices or networks. As an example and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1510 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1510 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1510 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 1512 may include hardware, software, or both that couples components of computing device 1500 to each other. As an example and not by way of limitation, communication infrastructure 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 16:
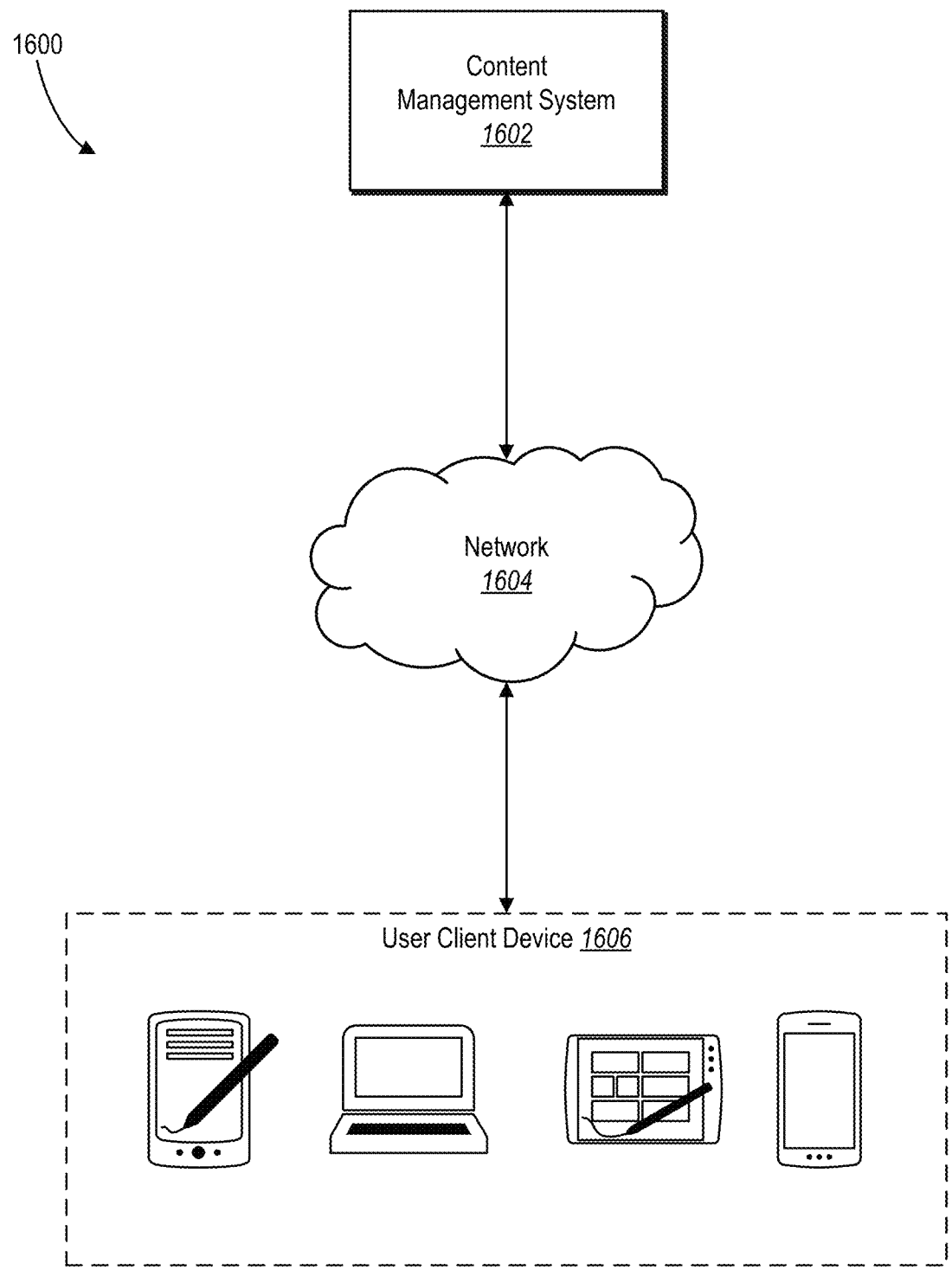
FIG. 16 illustrates an example environment of a networking system having the content block system in accordance with one or more embodiments.

FIG. 16 is a schematic diagram illustrating environment 1600 within which one or more implementations of the unified search system 106 can be implemented. As discussed above with respect to FIG. 1, in some embodiments the unified search system 106 can be part of a content management system 1002. In one or more embodiments, the content management system 1602 may generate, store, manage, receive, and send digital content (such as digital videos). For example, content management system 1602 may send and receive digital content to and from the user client device 1606 by way of network 1604. In particular, the content management system 1602 can store and manage a collection of digital content. The content management system 1602 can manage the sharing of digital content between computing devices associated with a plurality of users. For instance, the content management system 1602 can facilitate a user sharing a digital content with another user of content management system 1602.

In particular, the content management system 1602 can manage synchronizing digital content across multiple of the user client device 1606 associated with one or more users. For example, a user may edit digital content using user client device 1606. The content management system 1602 can cause user client device 1606 to send the edited digital content to content management system 1602. Content management system 1602 then synchronizes the edited digital content on one or more additional computing devices.

In addition to synchronizing digital content across multiple devices, one or more implementations of content management system 1602 can provide an efficient storage option for users that have large collections of digital content. For example, content management system 1602 can store a collection of digital content on content management system 1602, while the user client device 1606 only stores reduced-sized versions of the digital content. A user can navigate and browse the reduced-sized versions (e.g., a thumbnail of a digital image) of the digital content on user client device 1606. In particular, one way in which a user can experience digital content is to browse the reduced-sized versions of the digital content on user client device 1606.

Another way in which a user can experience digital content is to select a reduced-size version of digital content to request the full- or high-resolution version of digital content from content management system 1602. In particular, upon a user selecting a reduced-sized version of digital content, user client device 1606 sends a request to content management system 1602 requesting the digital content associated with the reduced-sized version of the digital content. Content management system 1602 can respond to the request by sending the digital content to user client device 1606. User client device 1606, upon receiving the digital content, can then present the digital content to the user. In this way, a user can have access to large collections of digital content while minimizing the amount of resources used on user client device 1606.

User client device 1606 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. User client device 1606 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1604.

Network 1604 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which user client devices 1606 may access content management system 1602.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
    receiving, from a client device, a search query for searching a hybrid search index;
    in response to the search query, generating, from the hybrid search index, a search result comprising one or more content items corresponding to the search query;
    ranking the one or more content items within the search result according to observation layer data defining historical display locations of the one or more content items included in the search result, world state data defining device metrics and environmental metrics of the one or more content items, and user interaction data corresponding to the one or more content items; and
    based on ranking the one or more content items, providing the search result for display on the client device in ranked order within a search result interface.

2. The computer-implemented method of claim 1, further comprising:
    detecting one or more changes to the world state data defining device metrics and environmental metrics of the one or more content items after receiving the search query; and
    updating the ranking of the one or more content items according to the one or more changes to the world state data defining device metrics and environmental metrics of the one or more content items.

3. The computer-implemented method of claim 1, further comprising:
    determining an event specific to an entity;
    based on an occurrence of the event, updating the ranking of the one or more content items corresponding to the search query for the entity; and
    based on updating the ranking of the one or more content items, providing the search result for display on the client device in an updated ranked order within the search result interface.

4. The computer-implemented method of claim 1, further comprising:
    generating, utilizing a large language model, a content item summary for one or more content items; and
    providing the content item summary for display on the client device as part of the search result.

5. The computer-implemented method of claim 1, further comprising:
    identifying a subset of content items from the one or more content items included in the search result based on a ranking of the one or more content items in the search result; and
    generating, utilizing a large language model, a search result summary comprising a combined summarization of the subset of content items.

6. The computer-implemented method of claim 1, further comprising:
    generating, utilizing a large language model, a content item rational indicating a rational for including the one or more content items in the search result; and
    providing the content item rational for display on the client device within the search result interface.

7. The computer-implemented method of claim 1, wherein the search query comprises at least one of text, imagery, or video.

8. A system comprising:
    at least one processor; and
    a non-transitory computer readable medium comprising instructions that, when executed by the at least one processor, cause the system to:

receive, from a client device, a search query for searching a hybrid search index;

in response to the search query, generate, from the hybrid search index, a search result comprising one or more content items corresponding to the search query;

rank the one or more content items within the search result based on weighing the one or more content items according to observation layer data defining historical display locations of the one or more content items included in the search result, world state data defining device metrics and environmental metrics of the one or more content items, and user interaction data corresponding to the one or more content items; and based on ranking the one or more content items, provide the search result for display on the client device in ranked order within a search result interface.

9. The system of claim 8, further comprising instructions that, when executed by the at least one processor, cause the system to:

further rank the one or more content items within the search result according to user interaction data defining one or more detected interactions with the one or more content items.

10. The system of claim 8, further comprising instructions that, when executed by the at least one processor, cause the system to:

determine a contextual understanding of an entity based on at least one of observation layer data, world state data, or user interaction data;

based on the contextual understanding, generate one or more search query suggestions corresponding to the entity; and in response to receiving a selection of the one or more search query suggestions, provide the search result for display on the client device.

11. The system of claim 8, further comprising instructions that, when executed by the at least one processor, cause the system to:

determine one or more changes to the observation layer data for a period of time after receiving the search query;

generate an updated search result comprising one or more additional content items for the search query based on the one or more changes to the observation layer data for the period of time; and provide the updated search result for display on the client device.

12. The system of claim 8, further comprising instructions that, when executed by the at least one processor, cause the system to:

receive from a search result input field within the search result interface, a search result question regarding one or more content items included in the search result;

generate, utilizing a large language model, a search result response corresponding to the search result question; and provide the search result response corresponding to the search result question within the search result interface.

13. The system of claim 8, further comprising instructions that, when executed by the at least one processor, cause the system to:

provide one or more preview images for the one or more content items included in the search result; and based on receiving a selection of a preview image from the one or more preview images for the one or more content items, provide for display on the client device a content item corresponding to the selected preview image within a content management system.

14. The system of claim 8, further comprising instructions that, when executed by the at least one processor, cause the system to:

receive from the client device a selection of a top ranked content item included in the search result;

provide for display on the client device a selectable content item augmentation element; and based on receiving a selection of the selectable content item augmentation element, add information from one or more lower ranked content items to the top ranked content item.

15. A non-transitory computer readable medium comprising instructions that, when executed by at least one processor, cause the at least one processor to:

receive, from a client device, a search query for searching a hybrid search index;

in response to the search query, generate, from the hybrid search index, a search result comprising one or more portions of one or more content items corresponding to the search query;

rank the one or more portions of the one or more content items within the search result according to observation layer data defining historical display locations of the one or more portions of the one or more content items included in the search result, world state data defining device metrics and environmental metrics of the one or more portions of the one or more content items, and user interaction data corresponding to the one or more portions of the one or more content items; and based on ranking the one or more portions of the one or more content items, provide the search result for display on the client device in ranked order within a search result interface.

16. The non-transitory computer readable medium of claim 15, further comprising instructions that, when executed by the at least one processor, cause the at least one processor to:

receive a selection of a content item included in the search result;

provide for display on the client device a selectable content item summarization element corresponding to the selected content item within the search result interface;

based on receiving a selection of the selectable content item summarization element, generate, utilizing a large language model, a content item summary for the selected content item; and provide the content item summary for display on the client device.

17. The non-transitory computer readable medium of claim 15, wherein ranking the one or more content items within the search query according to the user interaction data further comprises defining one or more detected interactions with the one or more portions of the one or more content items.

18. The non-transitory computer readable medium of claim 15, further comprising instructions that, when executed by the at least one processor, cause the at least one processor to:

identify a user type for a user account associated with the client device and a search query theme for the search query;

associate the user type with the search query theme; and based on identifying the user type on an additional client device, provide for display on the additional client device, a suggested search query corresponding to the search query theme.

19. The non-transitory computer readable medium of claim 15, further comprising instructions that, when executed by the at least one processor, cause the at least one processor to:

detect one or more changes to world state data defining device metrics and environmental metrics of the one or more portions of the one or more content items after receiving the search query;

update the rank of the one or more portions of the one or more content items based on the one or more changes to the world state data; and and based on updating the rank of the one or more portions of the one or more content items, provide an updated search result for display on the client device in an updated ranked order within the search result interface.

20. The non-transitory computer readable medium of claim 15, further comprising instructions that, when executed by the at least one processor, cause the at least one processor to:

generate, utilizing a large language model, a content item summary for a subset of content items from the one or more content items included in the search result, wherein, the content item summary includes one or more selectable connections corresponding to the subset of content items; and based on receiving an interaction with a selectable connection, provide for display within a content management system a content item from the subset of content items corresponding to the selectable connection.

\* \* \* \* \*